US012287127B2

United States Patent
Butler et al.

(10) Patent No.: US 12,287,127 B2
(45) Date of Patent: Apr. 29, 2025

(54) THERMAL BATTERY AND HEAT EXCHANGER ASSEMBLY USING PHASE CHANGE MATERIAL

(71) Applicant: Copeland LP, Sidney, OH (US)

(72) Inventors: Brian R. Butler, Sidney, OH (US); Andrew M. Welch, Sidney, OH (US)

(73) Assignee: Copeland LP, Sidney, OH (US)

( * ) Notice: Subject to any disclaimer, the term of this patent is extended or adjusted under 35 U.S.C. 154(b) by 81 days.

(21) Appl. No.: 17/520,187

(22) Filed: Nov. 5, 2021

(65) Prior Publication Data

US 2023/0148170 A1    May 11, 2023

(51) Int. Cl.
  F25B 13/00    (2006.01)
  F25B 41/26    (2021.01)
  F25B 41/40    (2021.01)

(52) U.S. Cl.
  CPC .............. *F25B 13/00* (2013.01); *F25B 41/26* (2021.01); *F25B 41/40* (2021.01); *F25B 2400/24* (2013.01); *F25B 2500/09* (2013.01)

(58) Field of Classification Search
  CPC ............ F24F 5/0021; F24F 2005/0025; F25B 25/005; F25B 41/26; F28D 20/02; F28D 20/021; F28D 2020/0008; F28D 2020/0013; F28F 21/065; F28F 21/066; F28F 3/10; Y02E 60/14
  See application file for complete search history.

(56) References Cited

U.S. PATENT DOCUMENTS

| | | | |
|---|---|---|---|
| 4,744,414 A | 5/1988 | Schon | |
| 5,355,688 A | 10/1994 | Rafalovich et al. | |
| 6,394,178 B1 | 5/2002 | Yoshida et al. | |
| 7,980,293 B2 | 7/2011 | Jensen | |
| 8,061,416 B2 | 11/2011 | Geskes et al. | |
| 9,212,834 B2 | 12/2015 | Parsonnet et al. | |
| 9,441,861 B2 | 9/2016 | Diamond et al. | |
| 10,451,316 B2 | 10/2019 | Diamond et al. | |
| 11,407,282 B2 * | 8/2022 | Chopard | ............... B60H 1/143 |
| 2014/0338389 A1 | 11/2014 | Ma et al. | |
| 2019/0226735 A1 | 7/2019 | Bissell et al. | |

(Continued)

FOREIGN PATENT DOCUMENTS

| | | |
|---|---|---|
| CN | 104246412 A * | 12/2014 |
| CN | 109186297 A | 1/2019 |

(Continued)

OTHER PUBLICATIONS

CN-104246412-A English Translation (Year: 2014).*

(Continued)

*Primary Examiner* — David J Teitelbaum
*Assistant Examiner* — Devon Moore
(74) *Attorney, Agent, or Firm* — Harness, Dickey & Pierce, P.L.C.

(57) ABSTRACT

A heating and cooling (HVAC) system that includes a compressor; a first heat exchanger; a second heat exchanger; a first expansion valve positioned between the first heat exchanger and the second heat exchanger; a first reversing valve that permits the system to operate in a first mode and a second mode; and a thermal battery including a phase change material therein that is configured to selectively store and release thermal energy received from a working fluid.

3 Claims, 19 Drawing Sheets

(56) References Cited

U.S. PATENT DOCUMENTS

| | | |
|---|---|---|
| 2019/0242657 A1 | 8/2019 | Ignatiev et al. |
| 2020/0400385 A1 | 12/2020 | Van Bael et al. |

FOREIGN PATENT DOCUMENTS

| | | | |
|---|---|---|---|
| CN | 110854470 A | | 2/2020 |
| EP | 2966382 A1 | * | 1/2016 |
| WO | WO-9915848 A1 | * | 4/1999 |
| WO | WO-2011040387 A1 | * | 4/2011 |
| WO | WO-2019129649 A1 | * | 7/2019 |
| WO | WO-2020090112 A1 | * | 5/2020 |
| WO | WO-2021072335 A1 | | 4/2021 |

OTHER PUBLICATIONS

WO-2011040387-A1 English Translation (Year: 2011).*
WO-2020090112-A1 English Translation (Year: 2020).*
Written Opinion and International Search Report issued in corresponding application No. PCT/US2022/048550 on Apr. 24, 2023.
U.S. Appl. No. 17/193,293, filed Mar. 5, 2021, Andrew M. Welch.

* cited by examiner

THERMAL BATTERY AND HEAT EXCHANGER ASSEMBLY USING PHASE CHANGE MATERIAL

FIELD

The present disclosure relates to thermal battery and heat exchanger assembly that uses a phase change material, and to systems incorporating the thermal battery and/or heat exchanger assembly.

BACKGROUND

This section provides background information related to the present disclosure which is not necessarily prior art.

A thermal storage device or battery is a device used for the purpose of storing and releasing thermal energy, which allows energy available at one time to be temporarily stored and then released at another time. Some thermal batteries also involve causing a thermal storage substance to transition thermally through a phase transition which causes even more energy to be stored and released. The thermal storage substances (phase change materials) used for thermal storage are capable of storing and releasing significant thermal capacity at the temperature that they change phase. These materials are chosen based on specific applications because there is a wide range of temperatures that may be useful in different applications and a wide range of materials that change phase at different temperatures.

In HVAC applications, thermal batteries enable the storing of heating or cooling energy during times of the day when electricity prices are low and/or when the HVAC system efficiency is at its peak. The stored energy may then be leveraged to perform all or a portion of heating or cooling that is required during a time of the day when electricity prices are greater and/or HVAC system efficiency is low. Thermal batteries, however, can be expensive based on the type of phase change material used, as well as the size and material required for the device holding the phase change material.

SUMMARY

This section provides a general summary of the disclosure and is not a comprehensive disclosure of its full scope or all of its features.

According to a first aspect of the present disclosure there is provided a heating and cooling (HVAC) system that includes a compressor; a first heat exchanger; a second heat exchanger; a first expansion valve positioned between the first heat exchanger and the second heat exchanger; a first reversing valve that permits the system to operate in a first mode and a second mode; and a thermal battery including a phase change material therein that is configured to selectively store and release thermal energy received from a working fluid, wherein the thermal battery includes a pair of end plates, each of the end plates including a first major surface and an opposite second major surface, the first major surfaces each including fluid inlet and a fluid outlet and the opposite second major surfaces each including a flow trough, the fluid inlet of each end plate being in communication with the flow trough formed on the opposite second major surface of the respective end plate; a plurality of flow plates sandwiched between the pair of end plates, each of the flow plates having a first side and an opposite second side, and each of the first side and the opposite second side including a flow surface, the flow surfaces of each flow plate being configured to communicate with either the flow trough of an adjacent end plate or one of the flow surfaces of an adjacent flow plate; a plurality of thermal energy transfer films that are respectively positioned between adjacent flow plates, and between each of the end plates and an immediately adjacent flow plate, such that a first flow path exists on one side of a respective thermal energy transfer film for the working fluid and a second flow path exists on an opposite side of the respective thermal energy transfer film for the phase change material; and the flow troughs and flow surfaces communicate with each other such that the working fluid that the flows through the first flow path enters the fluid inlet of one of the end plates will exit the fluid outlet of the other end plate while exchanging thermal energy with the phase change material that is provided in the second flow path that extends between the fluid inlet of the other end plate and the fluid outlet of the one end plate.

According to the first aspect, the compressor, the first heat exchanger, the first reversing valve, and the first expansion valve are located in a primary circuit, and the thermal battery is located in a secondary circuit that includes a third heat exchanger and a pump, wherein the second heat exchanger is shared by each of the primary circuit and the secondary circuit.

According to the first aspect, the working fluid is located in the secondary circuit and exchanges thermal energy with a refrigerant of the primary circuit in the second heat exchanger.

According to the first aspect, the secondary circuit further includes a second thermal battery, and a pair of three-way valves that are configured to either direct the working fluid to the thermal battery or the second thermal battery, or prevent the working fluid from reaching the thermal battery and the second thermal battery.

According to the first aspect, the HVAC system further includes a second expansion valve, wherein the thermal battery is positioned between the first and second expansion valves, and the working fluid is a refrigerant that is compressed by the compressor and that passes through each of the first heat exchanger and second heat exchanger.

According to the first aspect, the HVAC system further includes a second reversing valve that works in conjunction with the first reversing valve to control whether the system operates in the first mode or the second mode.

According to the first aspect, an orifice size of the first and second expansion valves can be modified to either expand the refrigerant or permit the refrigerant to flow therethrough without expansion.

According to a second aspect of the present disclosure, there is provided a heating and cooling (HVAC) system that includes a primary circuit including a refrigerant, a compressor, a first heat exchanger, a first reversing valve, a second reversing valve, an expansion valve located between the first reversing valve and the second reversing valve, and a thermal battery; and a secondary circuit including a working fluid, a pump, the thermal battery, and a second heat exchanger, wherein the compressor is configured to compress the refrigerant, the first reversing valve is configured to direct the refrigerant from the compressor to either the first heat exchanger or the thermal battery, and the second reversing valve is configured to direct the refrigerant from the thermal battery to either the expansion valve or the compressor; and the thermal battery is configured to exchange thermal energy with each of the working fluid and the refrigerant.

According to the second aspect, the thermal battery includes a first flow path for the working fluid and a second flow path for the refrigerant, and a plurality of phase change material storage plates that contains a phase change material for exchanging thermal energy with each of the working fluid and the refrigerant.

According to the second aspect, the thermal battery includes a first phase change material therein that is configured to selectively store thermal energy received from the refrigerant and release thermal energy to the refrigerant; and a second phase change material therein that is configured to selectively store thermal energy received from the working fluid and release thermal energy to the working fluid.

According to the second aspect, each of the phase change material storage plates include a plurality of corrugated members, the phase change material being located between each of the corrugated members.

According to the second aspect, each of the phase change material storage plates are sandwiched by a pair of flow plates, each of the flow plates including a plurality of dividing bars that are shaped to correspond to the corrugated members, the dividing bars of one flow plate that sandwiches the phase change material storage plate defining the first flow path for the working fluid and the dividing bars of another flow plate that sandwiches the phase change material storage plate defining the second flow path for the refrigerant.

According to the second aspect, each of the flow plates has a thickness less than a thickness of the phase change material storage plates.

According to a third aspect of the present disclosure there is provided a thermal battery including a phase change material therein that is configured to selectively store thermal energy received from a working fluid and release thermal energy to the working fluid. The thermal battery includes a pair of end plates, each of the end plates including a first major surface and an opposite second major surface, the first major surfaces each including a fluid inlet and a fluid outlet and the opposite second major surfaces each including a flow trough, the fluid inlet of each end plate being in communication with the flow trough formed on the opposite second major surface of the respective end plate; a plurality of flow plates sandwiched between the pair of end plates, each of the flow plates having a first side and an opposite second side, and each of the first side and the opposite second side including a flow surface, the flow surfaces of each flow plate being configured to communicate with either the flow trough of an adjacent end plate or one of the flow surfaces of an adjacent flow plate; a plurality of thermal energy transfer films that are respectively positioned between adjacent flow plates, and between each of the end plates and an immediately adjacent flow plate, such that a first flow path exists on one side of a respective thermal energy transfer film for the working fluid and a second flow path exists on an opposite side of the respective thermal energy transfer film for the phase change material; and the flow troughs and flow surfaces communicate with each other such that the working fluid that flows through the first flow path enters the fluid inlet of one of the end plates will exit the fluid outlet of the other end plate while exchanging thermal energy with the phase change material that is provided in the second flow path that extends between the fluid inlet of the other end plate and the fluid outlet of the one end plate.

According to the third aspect, the working fluid that enters the fluid inlet of the one end plate will enter the flow trough on the opposite second major surface of the one end plate and flow in a first direction before entering the flow surface of the adjacent flow plate and flowing in a second and opposite direction.

According to the third aspect, the pair of end plates and each of the flow plates are formed of a polymeric material that is impermeable and resistant to corrosion.

According to the third aspect, the thermal energy transfer films are each formed of a polymer film, and the thermal energy transfer films include one of a removable adhesive layer, an integral gasket, and a resilient sealant to sealingly engage with the end plates and the flow plates, the thermal energy transfer films are sealingly engaged with the end plates and the flow plates by being interference fit thereto, or the thermal energy transfer films are joined to the end plates and flow plates through application of heat.

According to the third aspect, turbulence inducing surfaces of the end plates and the flow plates each include a plurality of elongated bumps that extend across the first and second flow channels, respectively.

According to the third aspect, each of the flow plates includes a fluid inlet port and a fluid outlet port, wherein the fluid inlet port of a respective flow plate communicates with either the flow trough of the adjacent end plate or the fluid outlet port of the adjacent flow plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
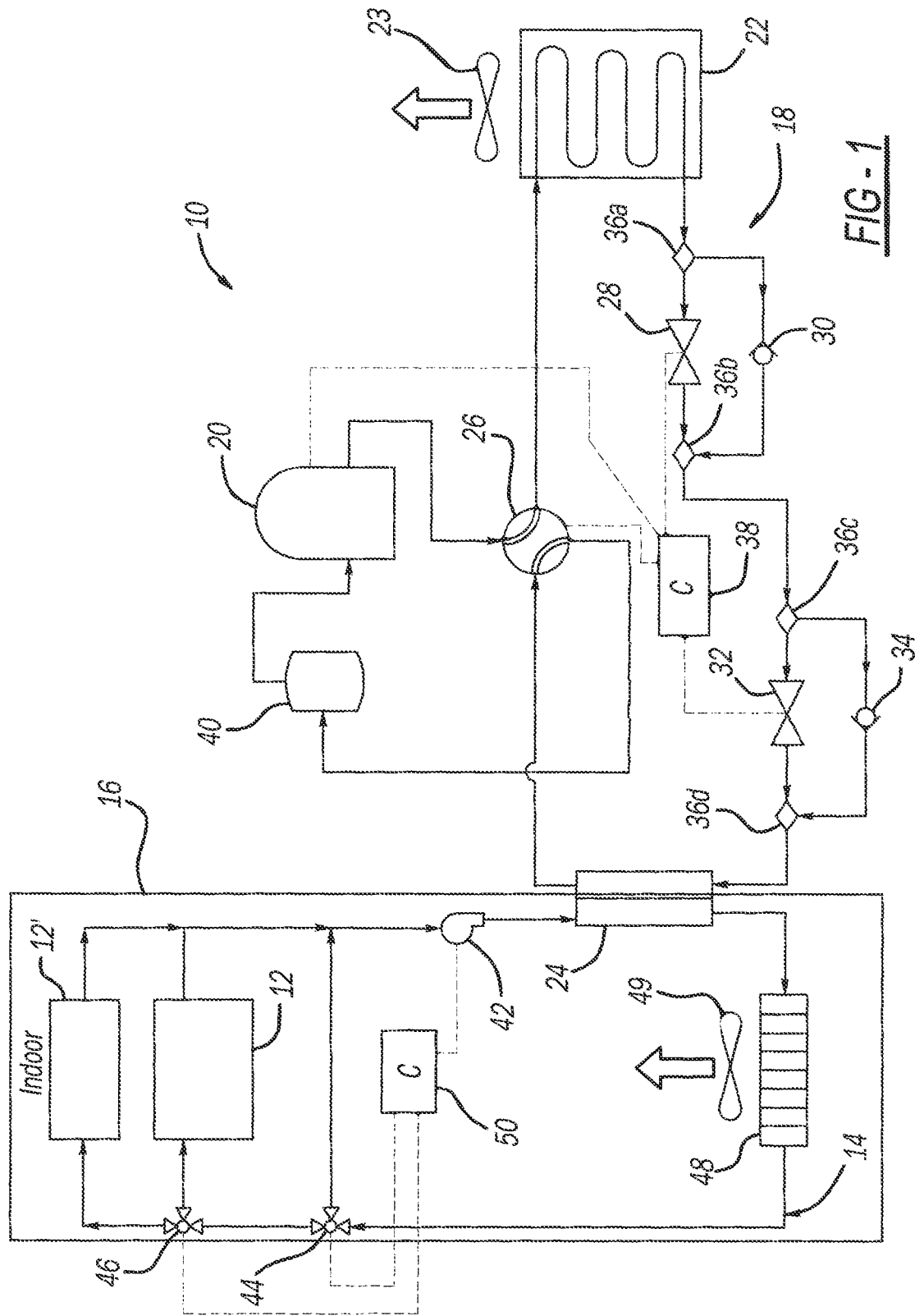
FIG. 1 is a schematic illustration of a heating and cooling system including a thermal storage device according to a principle of the present disclosure.

FIG. 1 illustrates an example HVAC system 10 that utilizes a thermal storage device or battery 12 according to a first embodiment of the present disclosure. In the illustrated embodiment, thermal battery 12 may be located within a secondary circuit or loop 14 of the HVAC system 10 that is located with an indoor structure 16. A primary circuit or loop 18 of the HVAC system 10 may be located in a location (e.g., outdoors) that is different from the secondary loop 14.

Primary loop 18 of HVAC system 10 may include a compressor 20, a first heat exchanger 22, a fan 23, a second heat exchanger 24, and a reversing valve 26 that enables primary loop 18 to operate in either a first mode (e.g., cooling) or a second mode (e.g., heating). Primary loop 18 may also include first expansion valve 28, a first check valve 30, a second expansion valve 32, and a second check valve 34. First and second check valves 30 and 34 are used so that the refrigerant can only flow through either the first expansion valve 28 or the second expansion valve 32 depending on the selected mode of operation. Electronic valves 36a-36d may be located on opposing sides of each expansion valve 28 and 32 that either permit the fluid to flow through one of the expansion valves 28 or 32 or permit the fluid to bypass one of the expansion valves 28 or 32 and flow through one of the check valves 30 or 34. The electronic valves 36a-d, the reversing valve 26, and the compressor 20 may each be in communication with a controller 38 that is configured to control operation of each.

In the illustrated embodiment, primary loop 18 is operating in the first mode (e.g., cooling) where the reversing valve 26 enables the refrigerant compressed by the compressor 20 to travel from the compressor 20 to the first heat exchanger 22 that operates as a condenser. After the refrigerant condenses in the first heat exchanger 22, the refrigerant travels from the first heat exchanger 22 to one of the electronic valves 36a located downstream therefrom where the refrigerant flow is diverted to bypass the first expansion valve 28 and pass through the first check valve 30, through another of the electronic valves 36b and toward the second expansion valve 32. Before reaching the second expansion valve 32, the refrigerant passes through electronic valve 36c that permits the refrigerant to pass through to the second expansion valve 32 where the refrigerant expands (e.g., begins to evaporate). After passing through the second expansion valve 32, the expanded refrigerant travels through electronic valve 36d that permits the refrigerant to flow toward second heat exchanger 24 where the refrigerant further evaporates before exiting the second heat exchanger 24, passes through reversing valve 26 and on to compressor 20 where the cycle repeats. Although not required, an accumulator 40 may be positioned upstream of compressor 20.

In the second mode (e.g., heating), the reversing valve 26 enables the refrigerant compressed by the compressor 20 to first travel from the compressor 20 to the second heat exchanger 24, which acts as a condenser where the compressed gaseous refrigerant condenses to a liquid. After the refrigerant condenses in the second heat exchanger 24, the refrigerant travels from the second heat exchanger 24 to one of the electronic valves 36d located downstream therefrom where the refrigerant flow is diverted to bypass the second expansion valve 32 and pass through the second check valve 34, through another of the electronic valves 36c and toward the first expansion valve 28. Before reaching the first expansion valve 28, the refrigerant passes through electronic valve 36b that permits the refrigerant to pass through to the first expansion valve 28 where the refrigerant further expands (e.g., begins to evaporate). After passing through the first expansion valve 28, the evaporated refrigerant travels through electronic valve 36a that permits the refrigerant to flow toward first heat exchanger 22 where the refrigerant further evaporates before exiting the first heat exchanger 22, passes through reversing valve 26 and on to compressor 20 where the cycle repeats.

Secondary loop 14 includes thermal battery 12, an optional second thermal battery 12', a pump 42 for pumping a working fluid through secondary loop 14 that can charge and discharge thermal batteries 12 and 12', a first three-way valve 44, an optional second three-way valve 46, the second heat exchanger 24, a third heat exchanger 48, and a fan 49. An example working fluid may be water. Other working fluids known to those skilled in the art are contemplated including, for example, a glycol such as ethylene glycol or a mixture of glycols. Alternatively, a mixture of water and at least one glycol may be used.

The use of secondary loop 14 increases the functionality of HVAC system 10. As noted above, primary loop 18 may operate in a first mode (e.g., cooling) and a second mode (e.g., heating). The secondary loop 14 having at least thermal battery 12 further enables HVAC system 10 to operate in a third mode where thermal battery 12 is charged, a fourth mode where thermal battery 12 may be charged or discharged while primary loop 18 functions in either the first mode or the second mode to assist with the cooling or heating provided by primary loop 18, and in a fifth mode where the indoor structure 16 is either heated or cooled using only the secondary loop 14. When thermal battery 12 is being "charged," it should be understood that the thermal energy received by the phase change material therein may be such that the phase change material becomes a liquid (i.e., receives thermal energy that causes the solid phase change material to change phase to liquid), or such that the phase change material becomes a solid or semi-solid (i.e., receives thermal energy that causes the phase change material to change from liquid to a solid or semi-solid). In either case, the energy received by the phase change material can be used assist in heating and cooling of indoor structure 16.

It should also be understood that the phase change material can be selected based on the desired temperature at which phase change occurs. In cooling applications, the phase change temperature should be less than or about equal to room temperature (i.e., about 70 degrees F., and ideally in the range of about 50 degrees F. to 60 degrees F.). In heating applications, the phase change temperature should be greater than room temperature (i.e., greater than 70 degrees F. up to about 100 degrees F.). In the illustrated embodiment, the thermal battery 12 can employ a single phase change material or can include multiple phase change materials. Example phase change materials include waxes and salts.

Charging of thermal battery 12 will now described relative to where primary loop 18 is operating in a heating mode (i.e., the second mode). During charging of thermal battery 12, the working fluid is being pumped by pump 42 through secondary loop 14. When the working fluid enters second heat exchanger 24, which is operating as a condenser where the refrigerant in primary loop 18 is cooled to convert the compressed gaseous refrigerant to a liquid, the thermal energy absorbed by second heat exchanger 24 as the compressed gaseous refrigerant condenses (i.e., cools) is transferred to the working fluid. After exiting second heat exchanger 24, the working fluid will travel to third heat exchanger 48, which simply permits the working fluid to pass through to first three-way valve 44 that will permit the heated working fluid to pass therethrough to second three way valve 46 and then to thermal battery 12 (i.e., fan 49 is not running). As the heated working fluid passes through thermal battery 12, the heated working fluid will exchange thermal energy with a phase-change material in the thermal battery 12, which retains the thermal energy absorbed from the working fluid to charge the thermal battery 12 (e.g., change the phase change material in thermal battery 12 from a solid or semi-solid to a liquid). Then the cooled working fluid may exit thermal battery 12 and continue to pump 42, where the process may be repeated. If the fan 49 is running while the heated or cooled working fluid passes through third heat exchanger 48, the heated or cooled working fluid may be used to heat or cool indoor structure 16 (i.e., fourth or fifth mode). When thermal battery 12 is not being used, pump 42 can be turned off by a second controller 50.

Alternatively, if thermal battery 12 is not being used, it should be understood that first three-way valve 44 permits thermal battery 12 to be bypassed. In this regard, three-way valve 44 may be controlled by second controller 50, which as noted above may also be used to control pump 42. Alternatively, three-way valve 44 and pump 42 may be controlled by controller 38. If thermal battery 12 is being bypassed, the working fluid may continue to be circulated through secondary loop 14 by pump 42.

As noted above, when thermal battery 12 is charged, thermal battery 12 may be used to assist primary loop 18 in heating or cooling indoor structure 16. This is particularly advantageous during times of the day when electricity prices are low and/or when the HVAC system efficiency is at its peak. When thermal battery 12 is not being used or charged, thermal battery 12 may be bypassed through use of three-way valves 44 and 46.

To discharge the thermal battery 12 when the phase change material therein is in a liquid phase, the working fluid may receive thermal energy (i.e., be heated) from thermal battery 12 and pumped by pump 42 towards second heat exchanger 24, which is operating as an evaporator (i.e., primary loop 18 is operating in a cooling mode). The refrigerant in primary loop 18 can receive the thermal energy in second heat exchanger 24 from the heated working fluid received from thermal battery 12 to assist in the evaporation of the refrigerant in primary loop 18. After exiting second heat exchanger 24, the working fluid will travel to third heat exchanger 48. The cooled working fluid in third heat exchanger 48 can then be used to further cool indoor structure 16.

If thermal battery 12 has been charged such that the phase change material therein is in a solid or semi-solid phase, the working fluid may be cooled by thermal battery 12 and pumped by pump 42 towards second heat exchanger 24, which may be operating as a condenser (i.e., primary loop in operating in a heating mode). The refrigerant in primary loop 18 can release thermal energy to the second heat exchanger 24 that can be received by the cooled working fluid received from thermal battery 12 to assist in the condensing of the refrigerant in the primary loop 18. After exiting second heat exchanger 24, the working fluid will travel to third heat exchanger 48. The heated working fluid in third heat exchanger 48 can then be used to further heat indoor structure 16.

Although not required, it should be understood that secondary loop 14 may include the above-noted second thermal battery 12' in parallel with thermal battery 12. If such a configuration is adopted, one thermal battery (e.g., battery 12) may be used for heating and the other thermal battery (e.g., battery 12') can be used for cooling. Second three-way valve 46 permits the working fluid to flow to either the thermal battery 12 or the second thermal battery 12' and may also be controlled by controller 50 or controller 38. As noted above, the phase change material can be selected based on the desired temperature at which phase change occurs. Thus, if battery 12' is being used for heating, the phase change material contained therein can be a material that changes phase at temperatures greater than room temperature (i.e., temperatures greater than 70 degrees F. and less than about 100 degrees F.). Conversely, if battery 12' is being used for cooling, the phase change contained therein may change phase at temperatures less than to about equal to room temperature (i.e., at temperatures between 50 degrees F. to 70 degrees F., and ideally at temperatures between 50 degrees F. to 60 degrees F.). If primary loop 18 is being used for heating, the first three-way valve 44 may be used to bypass battery 12'. Conversely, if primary loop 18 is being used for cooling, the three-way valves may be used to bypass battery 12.

Compressor 20 may be any type of compressor known to one skilled in the art including, for example, a capacity modulated or variable speed scroll compressor. Other types of compressors 20, however, are contemplated including reciprocating compressors, centrifugal compressors, and the like. When compressor 20 is a capacity modulated or variable speed compressor, the compressor 20 can operate more efficiently and at a lower capacity when operated in parallel with secondary loop 14 (i.e., when used in parallel with thermal battery 12). The compressor 20 may operate at a higher capacity to simultaneously charge thermal battery 12 and cool/heat the indoor structure 16. The refrigerant used by primary loop 18 may be any type of refrigerant known to one skilled in the art.

Now referring to FIGS. 2 to 14, example thermal batteries 12 according to a principle of the present disclosure are illustrated. While the below description will be relative to a thermal battery 12, it should be understood that the below-described structures may also be used for the thermal battery 12' and for the above-noted second heat exchanger 24 as described in U.S. patent application Ser. No. 17/193,293 filed Mar. 5, 2021, and assigned to Emerson Climate Technologies, Inc., which is incorporated by reference herein in its entirety.

Figure 4:
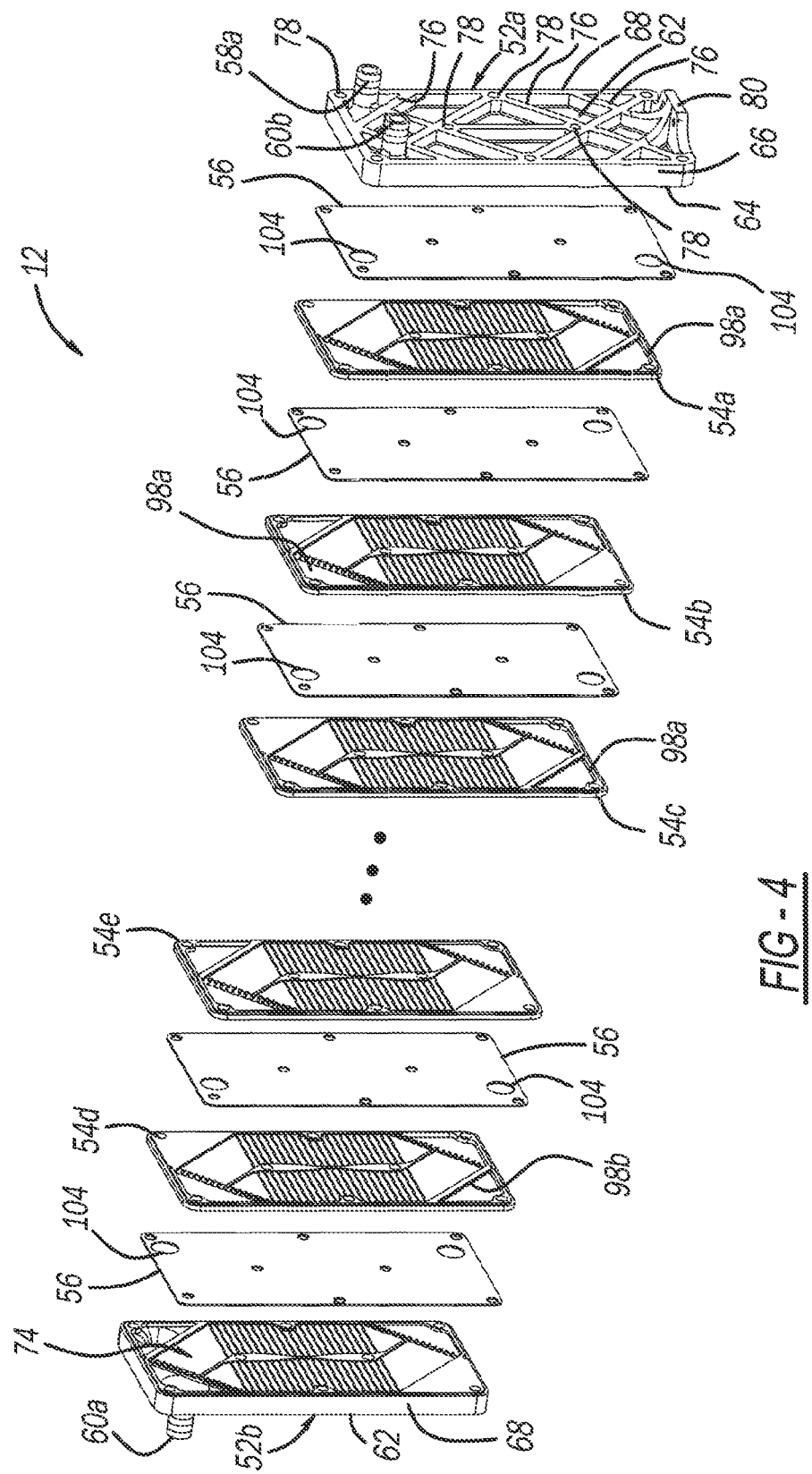
FIG. 4 is an exploded-perspective view of the first example thermal storage device illustrated in FIG. 2.
Figure 5:
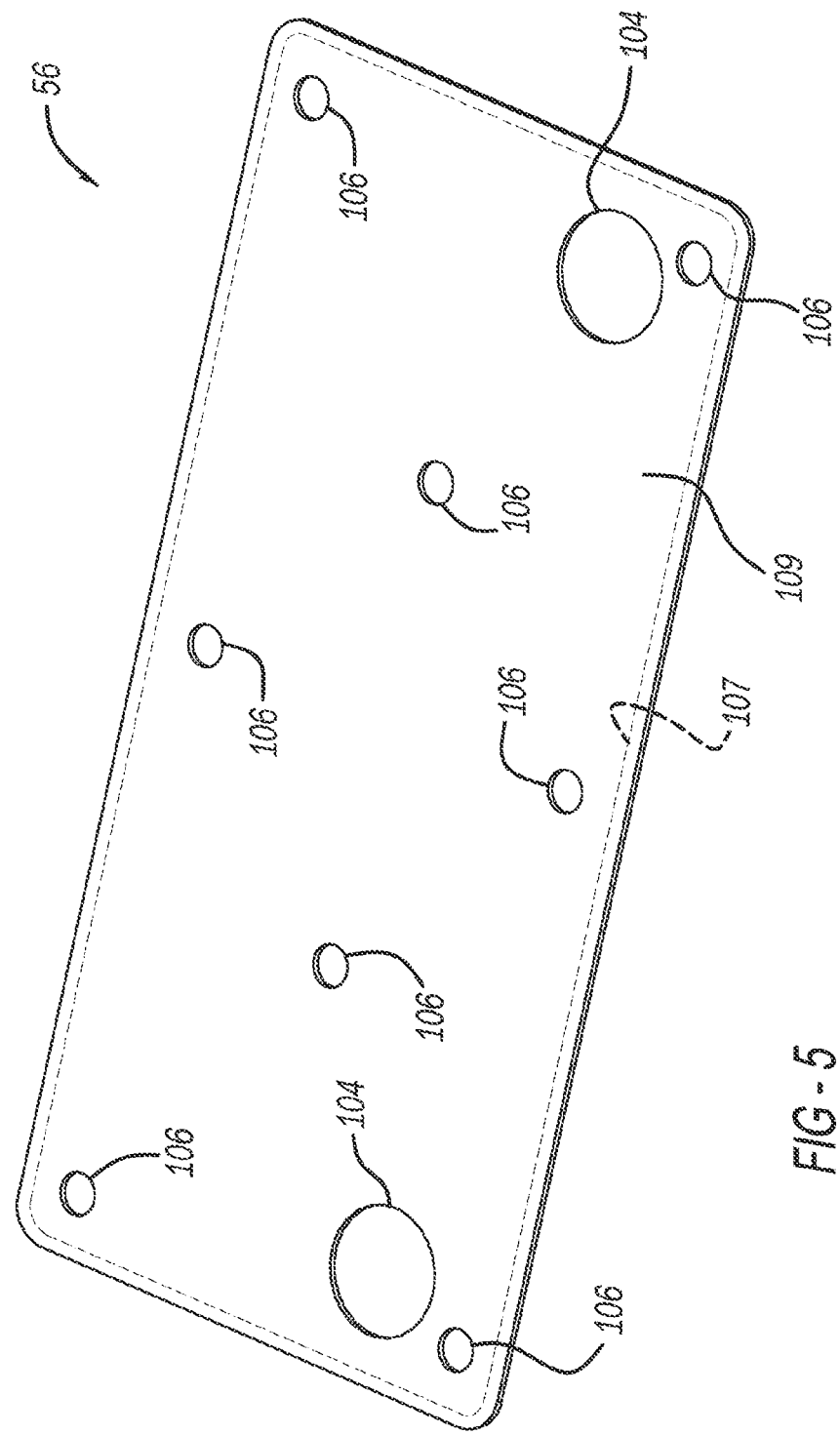
FIG. 5 is a perspective view of a thermal energy transfer film according to a principle of the present disclosure.

FIGS. 2-7 illustrate a first example thermal battery 12 according to the present disclosure. Thermal battery 12 includes a pair of end plates 52a and 52b, a plurality of flow plates 54 that are sandwiched by the pair of end plates 52a and 52b, and a plurality of thermal energy transfer films 56. A thermal energy transfer film 56 is located between each end plate 52a, 52b and an adjacent flow plate 54, as well as between adjacent flow plates 54. While five flow plates 54 are illustrated in FIG. 4, it should be understood that this configuration is only an example, and a greater or lesser number of flow plates 54 can be used in thermal battery 12 dependent on the application in which thermal battery 12 is to be used.

End plates 52a and 52b are preferably formed of a polymeric material that is impermeable and resistant to corrosion. While polymeric materials are preferable, it should be understood that end plates 52a and 52b may be formed of a metal material such as a sintered metal material, if desired. In the illustrated embodiment, end plate 52a includes a working fluid inlet 58a (FIG. 2) while end plate 52b includes a working fluid outlet 58b. Similarly end plate 52b includes a phase change material inlet 60a while end plate 52a includes a phase change material outlet 60b. It should be understood that after thermal battery 12 has been filled with phase change material at inlet 60a and the phase change material begins to exit outlet 60b, the flow of phase change material into thermal battery 12 is stopped and the inlet 60a and outlet 60b are capped (not illustrated) such that the phase change material remains stationary in the thermal battery 12 to exchange thermal energy with the working fluid that will be permitted to flow through thermal battery 12 from inlet 58a to outlet 58b when thermal battery 12 is part of the HVAC system. It should be understood, however, that the working fluid outlet 58a of end plate 12b may instead function as a working fluid inlet and working fluid inlet 58a may instead function as a working fluid outlet, if desired. In addition, it should be understood fluid inlets 58a and 60a and fluid outlets 58b and 60b may be unitary with end plates 52a, 52b, or may be formed separately from end plates 52a, 52b and attached thereto using an adhesive (not shown), chemical bonding, welding, a threaded connection, or some other type of attachment method known to one skilled in the art.

Figure 6:
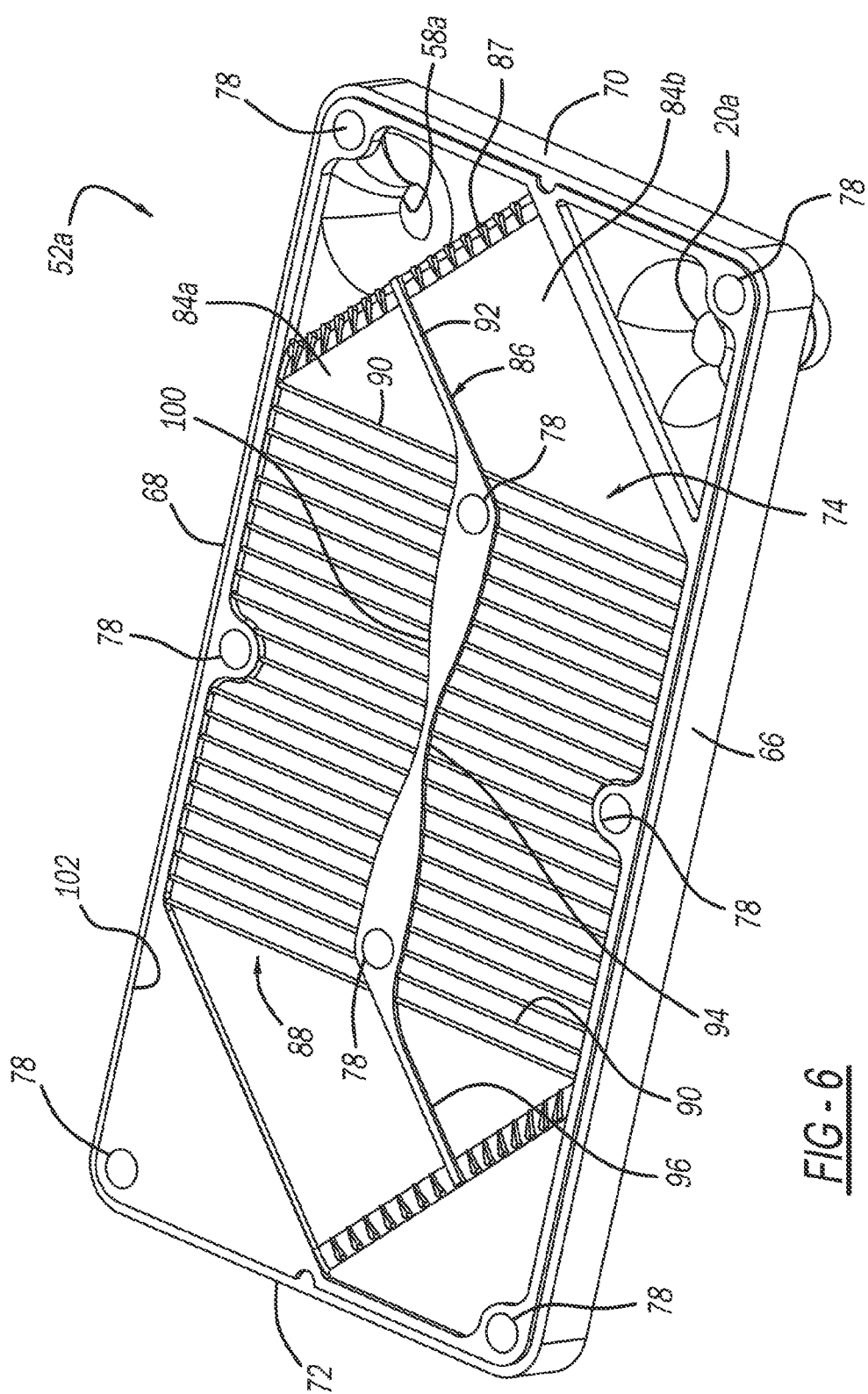
FIG. 6 is a perspective view of a flow-surface side of an end plate used in a first example thermal storage device according to a principle of the present disclosure.
Figure 7:
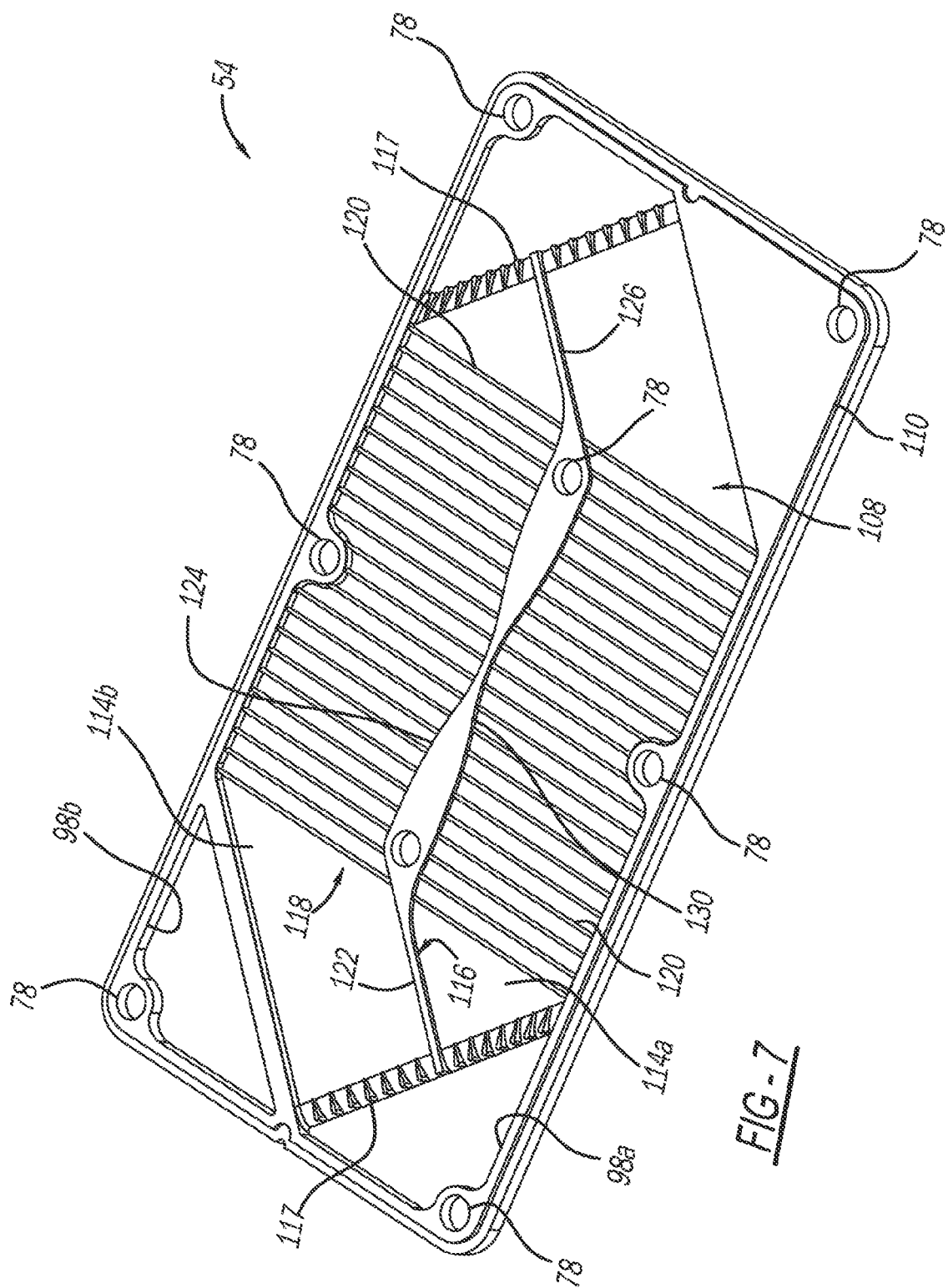
FIG. 7 is a perspective view of a flow plate used in the first example thermal storage device illustrated in FIG. 2.

In the illustrated embodiment, end plates 52a and 52b are rectangular-shaped planar members including a first major surface 62, an opposite second major surface 64, a first major side surface 66, a second major side surface 68, a third minor side surface 70, and a fourth minor side surface 72. First major surfaces 62 of end plates 52a and 52b define an exterior of thermal battery 12 and includes fluid inlets 58a and 60a and fluid outlets 58b and 60b extending outward therefrom at a location proximate third minor side surface 70, while second major surface 64 of each of the end plates 52a and 52b includes a flow trough 74 similar to or the same as the flow surfaces used on flow plates 54 as shown in FIGS. 6 and 7 and as will be described in more detail later. While fluid inlets 58a and 60a and fluid outlets 58b and 60b are illustrated as being proximate third minor side surface 70 of each of the end plates 52a and 52b, it should be understood that fluid inlets 58a and 60a and fluid outlets 58b and 60b could be located elsewhere on first major surface 62 without departing from the scope of the present disclosure.

In addition to fluid inlets 58a and 60a and fluid outlets 58b and 60b, first major surface 62 of each end plate 52a and 52b may also include a plurality of ribs 76 that increase the rigidity of end plates 52a and 52b to withstand fluid pressures and pressure fluctuations that may occur during the thermal energy exchange process. While ribs 76 are illustrated as extending diagonally from a first major side surface 66 of the end plate 52 to second major side surface 68, it should be understood that any configuration for ribs 76 may be used so long as ribs 76 satisfactorily increase the rigidity of end plates 52a and 52b to withstand fluid pressures and pressure fluctuations that may occur during the thermal energy exchange process.

Figure 2:
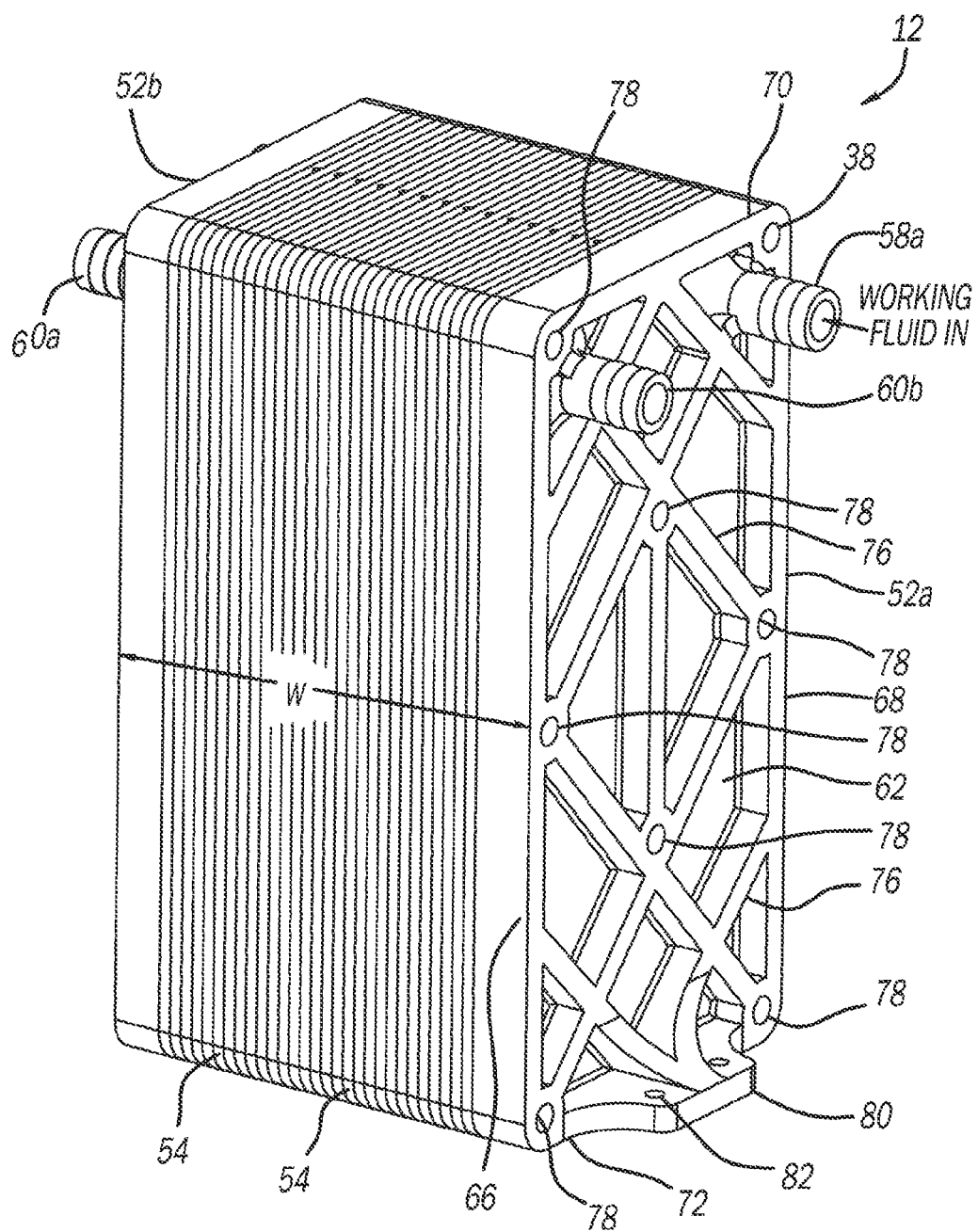
FIG. 2 is a perspective view of a first example thermal storage device according to a principle of the present disclosure.
Figure 3:
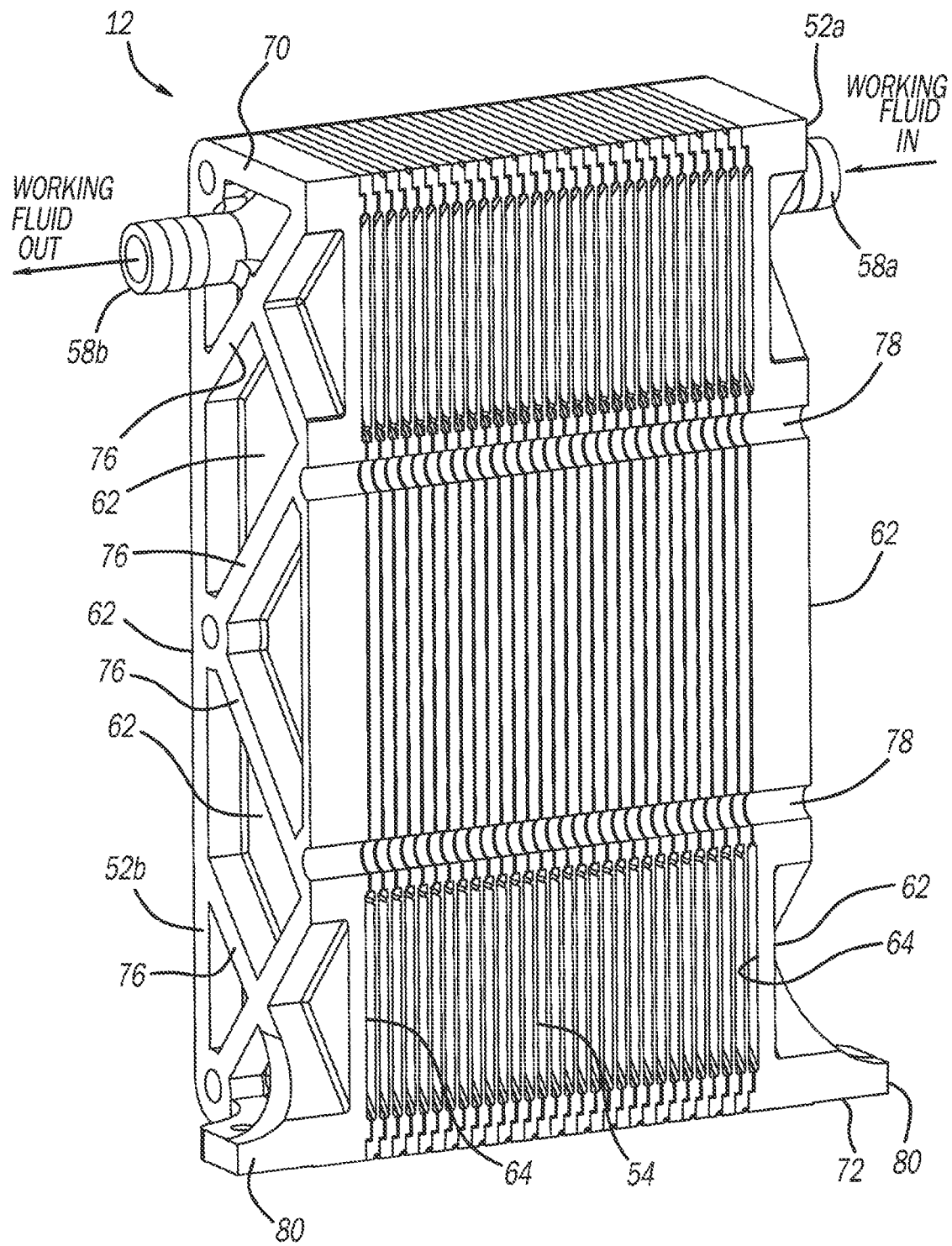
FIG. 3 is a cross-sectional view of the first example thermal storage device illustrated in FIG. 2.

End plates 52a and 52b also include a plurality of apertures 78 that are each configured for receipt of a fastener (not shown) that extends through the entire width W of the thermal battery 12 (i.e., from end plate 52a to the opposite end plate 52b as best shown in FIG. 2), and an outwardly extending flange 80 having through-holes 82 for rigidly attaching thermal battery 12 to a surface (not shown) that can be used to support thermal battery 12.

As best shown in FIG. 6, second major surface 64 of end plate 52a defines a flow trough 74 that, in the illustrated embodiment, communicates with fluid inlet 58a. The flow trough 34 includes a pair of flow channels 84a and 84b that are separated by a dividing wall 86. Although only a single dividing wall 86 is illustrated, it should be understood that multiple dividing walls 86 can be used to ensure proper support of thermal energy transfer films 56, as will be described in more detail later. As the working fluid enters from fluid inlet 58a, the working fluid may enter either of the flow channels 84a and 84b and flow toward fourth minor side surface 72. As the fluid flows through either of the flow channels 84a and 84b, the fluid will first pass through a plurality of nubs 87 formed in each flow channel 84a, 84b. Nubs 87 are designed to increase structural rigidity of end plate 52a, as well as provide support for fluid transfer film 56.

After passing through nubs 87, the working fluid will encounter a textured or turbulence inducing surface 88 that increases the turbulence of the working fluid, which enhances thermal energy exchange of the working fluid with the thermal energy transfer film 56 positioned between the second major surface 64 of end plate 52a and the adjacent flow plate 54 to the phase change material on the other side of the thermal energy transfer film 56, or vice versa. In other words, the flow of working fluid along flow channels 84a and 84b transitions from a laminar flow to a turbulent flow when the fluid encounters turbulence inducing surface 88.

Turbulence inducing surface 88 includes a plurality of elongated ribs or bumps 90 that extend in a direction from first major side surface 66 toward second major side surface 68 across end plate 52a. While bumps 90 are each illustrated as being elongated, a series of bumps 90 that appear to form a dotted line may be used instead, if desired. In addition, it should be understood that any type of dimensional feature having a variable size, shape, and quantity can be used in place of bumps 90 so long as the dimensional feature provides for a turbulent flow of the working fluid while flowing along turbulence inducing surface 88, and assists in controlling the amount of thermal energy transfer, pressure loss of the fluid, and the effectiveness of the thermal battery 12.

Dividing wall 86 includes a first section 92 located proximate fluid inlet 58a that transitions to second section 94 that travels along a center of end plate 52a, which transitions to a third section 96 that is located proximate an inlet port 98a or 98b formed in the adjacent flow plate 14 (FIG. 6). Third section 56 may be contoured at 100 to assist in increasing turbulence of the working fluid flow through flow trough 74. In addition to dividing flow trough 74 into a pair of flow channels 84a and 84b, dividing wall 86 also provides additional structural rigidity to end plate 52a to withstand fluid pressures and pressure fluctuations that may occur during the thermal energy exchange process. In addition, it should be noted that dividing wall 86 includes apertures 78 that are configured for receipt of the fasteners (not illustrated) that extend through thermal battery 12. Thus, dividing wall 86 also provides increased structural rigidity to thermal battery 12 to withstand tightening of the fasteners (not illustrated) to an extent that thermal battery 12 will remain hermetically sealed throughout use of thermal battery 12.

Thermal energy transfer films 56 (FIGS. 4 and 5) are polymer films that are formed of a corrosion-resistant material such as polyether ether ketone (PEEK), polyethylene, acrylonitrile butadiene styrene (ABS), polyvinyl chloride (PVC), or some other type of polymer material that is corrosion-resistant and satisfactory for thermal energy exchange. Thermal energy transfer films 56 are shaped to correspond to a recess 102 formed in second major surface 64 of end plate 52a such that an entirety of flow trough 74 is covered by the thermal energy transfer film 56.

Although not required, thermal energy transfer film 56 may include a gasket 107 integral with the thermal energy transfer film 56 and/or the thermal energy transfer film 56 may have a removable adhesive layer 109 that maintains its adhesive quality when removed from the thermal energy transfer film 56. Alternatively, gasket 107 may be in the form of a resilient sealant that is applied to the thermal energy transfer film 56, the thermal energy transfer film 56 may be shaped such that a perimeter of the thermal energy transfer film 56 is configured to be interference fit with an adjacent end plate 52a, 52b or flow plate 54, or the thermal energy transfer film 56 can be joined to an end plate 52a, 52b or flow plate 54 through application of heat.

Thermal energy transfer film 56 includes openings 104 that permit fluid to pass from flow trough 74 to one of the inlet ports 98a or 98b of the adjacent flow plate 54. While thermal energy transfer film 56 may also include holes 106 that correspond to apertures 78 to permit the fasteners (not shown) that bind thermal battery 12 together to pass through thermal energy transfer film 56, it should be understood that holes 106 are optional to an extent that the fasteners (not shown) may simply pierce the polymer material of the thermal energy transfer film 56 when inserted through the thermal battery 12. A thickness of the thermal energy transfer films 56 is variable dependent on the application in which thermal battery 12 is being used. In the illustrated embodiment, however, a thickness of the thermal energy transfer films 56 may be in the range of 0.0005 inches to 0.010 inches (0.0127 to 0.254 mm).

Now referring to FIGS. 4 and 7, the plurality of flow plates 54 will be described. Flow plates 54 may be formed of the same material as end plates 52a and 52b. For example, flow plates 54 can be formed of a polymeric material or a metal material. Alternatively, flow plates 54 can be formed of a different material in comparison to end plates 52a and 52b. For example, flow plates 54 can be formed of a polymeric material that is different from the polymeric material of end plates 52a and 52b, or flow plates 54 can be formed of a metal material while end plates 52a, 52b are formed of a polymeric material. Regardless, the construction of each of the flow plates 54 is the same, albeit arranged alternately in opposite manners throughout the thermal battery 12, which will be described in detail later. As best shown in FIG. 7, each flow plate 54 is shaped to correspond to the shape of end plate 52a. Flow plate 54 includes a first flow surface 108 formed on a first major side 110 and a second flow surface (not shown) formed on a second major side 112 of the flow plate 54. While the second flow surface is not illustrated in FIG. 7, it should be understood that the second flow surface is a mirror image of that illustrated in FIG. 7.

The flow surfaces 108 of flow plate 54 are similar to the flow troughs 74 of end plates 52a and 52b. In this regard, the flow surfaces 108 include a pair of flow channels 114a and 114b that are separated by a dividing wall 116. Although only a single dividing wall 116 is illustrated, it should be understood that multiple dividing walls 116 can be used to ensure proper support of thermal energy transfer films 56, as will be described in more detail later. As the working fluid enters from one of the inlet ports 98a or 98b, the fluid may enter either or both of the flow channels 114a and 114b and flow away from the inlet port 98a or 98b. As the working fluid flows through either of the flow channels 114a and 114b, the fluid will first pass through a plurality of nubs 117 formed in each flow channel 114a, 114b. Nubs 117 are designed to increase structural rigidity of flow plate 54, as well as provide support for thermal energy transfer film 56. After passing through nubs 117, the working fluid will encounter a textured or turbulence inducing surface 118 that increases the turbulence of the working fluid, which enhances thermal energy exchange of the working fluid with the thermal energy transfer film 56 positioned between the second major surface 64 of end plate 52a and the adjacent flow plate 54 to the phase change material on the other side of the thermal energy transfer film 56, or vice versa. Turbulence inducing surface 118 includes a plurality of elongated ribs or bumps 120 that extend in a direction across flow plate 54. While bumps 120 are each illustrated as being elongated, a series of bumps 120 that appear to form a dotted line may be used instead, if desired.

Dividing wall 116 includes a first section 122 located proximate inlet port 98a or 98b that transitions to second section 124 that travels along a center of flow plate 54, which transitions to a third section 126 that is located proximate an inlet port 98a or 98b formed in the adjacent flow plate 54 (FIG. 4). Third section 126 may be contoured at 130 to assist in increasing turbulence of the fluid flow through flow surface 108. In addition to dividing flow surface 108 into a pair of flow channels 114a and 114b, dividing wall 116 also provides additional structural rigidity to flow plate 54 to withstand fluid pressures and pressure fluctuations that may occur during the thermal energy exchange process. In addition, it should be noted that dividing wall 116 includes apertures 78 that are configured for receipt of the fasteners (not illustrated) that extend through thermal battery 12. Thus, dividing wall 116 also provides increased structural rigidity to thermal battery 12 to withstand tightening of the fasteners (not illustrated) to an extent that thermal battery 12 will remain hermetically sealed throughout use of thermal battery 12.

It should be understood that the shape of end plates 52a, 52b and flow plates 54 support the thermal energy transfer films 56 such that a minimum area of the thermal energy transfer film 56 is unsupported by features of the end plates 52a, 52b and flow plates 54 such as the recess 102 of the end plates 52a, 52b, the dividing wall 86 and nubs 87 of the end plates 52a, 52b, and the dividing wall 116 and nubs 117 of the flow plates 54. Supporting the thermal energy transfer films 56 in this manner assists in preventing the thermal energy transfer films 56 from losing its form or leaking.

Preferably, the distance of an unsupported area of the thermal energy transfer film 56 ranges between 0.25 inches to 3 inches. Thus, in larger thermal batteries 12, it may be useful to include multiple dividing walls 86 and 116 to ensure that the distance of an unsupported area of the thermal energy transfer film 56 ranges between 0.25 inches to 3 inches. Moreover, it should be understood that end plates 52a, 52b and flow plates 54 can be formed by an injection or compression molding method, by 3D printing, or some other type of manufacturing method. Any of these methods enable end plates 52a, 52b and flow plates 54 to have each of the above-described support features in any manner or configuration desired and permits the flow troughs 74 and flow surfaces 108 to have the textured or turbulence inducing surface in any configuration desired which enables designs that can be tailored to a specific application.

Now flow of the working fluid through the thermal battery 12 will be described. As best shown in FIG. 4, the working fluid may enter thermal battery 12 through fluid inlet 58a of end plate 52a and travels through flow trough 74 toward the inlet port 98a of the flow plate 14a arranged adjacent end plate 52a (i.e., in a downward direction in FIG. 4). While in flow trough 74 of end plate 52a, the working fluid will exchange thermal energy with thermal energy transfer film 56 and the stationary phase change material located on the opposite side of thermal energy transfer film 56. As the working fluid travels from flow trough 74 of end plate 52a toward the inlet port 98a of the flow plate 54a, the working fluid will flow from flow trough 74 of end plate 62a through opening 104 in thermal energy transfer film 56, and then through inlet port 98a of the adjacent flow plate 54a. The working fluid will then flow in the opposite direction along flow surface 108 of the adjacent flow plate 54a (i.e., in an upward direction in FIG. 4), which is not visible in FIG. 4, toward an inlet port 98a of an adjacent flow plate 14b, at which time the working fluid will pass through the opening 104 in the thermal energy transfer film 56 between the flow plates 54a and 54b, through the fluid inlet port 98a of the flow plate 54b, and then along the flow surface 108 of the flow plate 54b (i.e., in a downward direction in FIG. 4). During flow along flow surface 108 of flow plate 54b that is not visible in FIG. 4, the working fluid will exchange thermal energy with thermal energy transfer film 56 between flow plate 54b and adjacent flow plate 54c before entering the opening 104 in the thermal energy transfer film 56 and then through inlet port 98a of the flow plate 54c. This back and forth flow through the thermal battery will continue until the working fluid exits the outlet port 58b of end plate 52b.

Similarly, when thermal battery 12 is filled with the phase change material before capping the inlet 60a and outlet 60b, the phase change material will enter the fluid inlet 60a of end plate 52b and it will travel down along flow trough 74 of end plate 52b toward the inlet port 98b of a flow plate 54d, pass through the opening 104 in the thermal energy transfer film 56 between the end plate 52b and the flow plate 54d, enter the inlet port 98b of the flow plate 54d, and then travel upward along the flow surface 108 of flow plate 54d toward the inlet port 98b of the flow plate 14e, where the process continues such that the phase change material will travel back and forth through the thermal battery 12 until the phase change material reaches the fluid outlet 60b of end plate 52a to fill the thermal battery, and at which time the fluid inlet 60a and fluid outlet 60b are capped (i.e., sealed) to maintain the phase change material in the thermal battery 12. Then, as the working fluid flows through the thermal battery 12 as described above, thermal energy will exchange from the working fluid through the thermal energy transfer film 56 to the stationary phase change material located on the other side of the thermal energy transfer film 56. This is possible because each side of each flow plate 54 includes a flow surface 108. In this manner, as the working fluid travels over one side of the flow plate 54 and the phase change material is located on a side of an adjacent flow plate 54 with the thermal energy transfer film 56 located between the working fluid and the phase change material, thermal energy is exchanged between the working fluid through the thermal energy transfer film 56 to the phase change material. As noted previously, the phase change materials may be selected based on temperatures experienced in the system that incorporates the phase change material. In this regard, different phase change materials may be useful in different applications. Example phase change materials that are useful in the present disclosure include various waxes and salts.

In above-described embodiment, the working fluid flows through the thermal battery 12 in a counter-flow manner. The present disclosure should not be limited to such a configuration. In this regard, thermal battery 12 may be configured such that there may be a parallel-flow of the working fluid through the thermal battery 12. In a parallel-flow thermal battery 12, the fluid outlet 60b of end plate 52a will function as a second fluid inlet 58a, and the fluid inlet 60a of end plate 52b will function as a second fluid outlet 52b. In other words, if the phase change material were permitted to simultaneously freely flow through the thermal battery (note—the phase change material does not flow during use of thermal battery 12), the working fluid and phase change material would simultaneously enter the two fluid inlets formed on end plate 12a before subsequently simultaneously exiting the thermal battery 12 through the two fluid outlets formed on end plate 52b. In such a configuration, instead of the working fluid and phase change material flowing in opposite directions while separated by the thermal energy transfer films 56 like in the counter-flow configuration, the working fluid and phase change material may each flow in the same direction while being separated by the thermal energy transfer films 56. In either case, thermal energy is exchanged between the working fluid and the phase change material. As noted above, the phase change material only flows through the thermal battery 12 when being filled with the phase change material. Inasmuch as the inlet and outlet are capped after filling the thermal battery 12 with the phase change material, the only material that "flows" through the thermal battery during use thereof is the working fluid or refrigerant. The "parallel flow" described above is merely to distinguish the counter-flow design relative to the parallel flow design.

As the working fluid enters fluid inlet 58a, the working fluid will enter the flow trough 74 of end plate 52a and flow towards the lower opening 104 of thermal energy transfer film 56 located between the end plate 52a and flow plate 54a. The working fluid will then flow through the lower opening 104 and fluid inlet port 98a of flow plate 54a before entering the flow surface 68 of flow plate 54a located on the side of flow plate 14a that is not visible in FIG. 4. Then, the working fluid will flow upward along flow surface 108 of flow plate 54a before passing through the upper opening 104 of the thermal energy transfer film 56 located between flow plate 54a and 54b, passing through fluid inlet port 98 of flow plate 54b, and entering the flow surface 108 of flow plate 54b located on the side of flow plate 54b that is not visible in FIG. 4. The working fluid will continue in this fashion until exiting fluid outlet 60b of end plate 52b.

Similarly, when filling the thermal battery 12 with the phase change material, the phase change material that enters the second fluid inlet 58a of end plate 52a will immediately pass through the upper opening 104 of thermal energy transfer film 56 between end plate 52a and flow plate 54a before entering the flow surface 108 on flow plate 54a that is visible in FIG. 4. The phase change material will flow down the visible flow surface 108 of flow plate 54a as the working fluid is flowing in the same direction down the flow trough 104 of end plate 52a, while being separated by the thermal energy transfer film 56 between end plate 52a and flow plate 54a. After filling, the inlet and outlets are capped.

Because the working fluid may be warm and the phase change material may be cool (e.g., solid or semi-solid), or vice versa, the working fluid flowing past the stationary phase change material will exchange thermal energy with each other via the thermal energy transfer film 56. The working fluid will continue to flow back and forth in parallel relative to the stationary phase change material until the working fluid exits the thermal battery 12 through the fluid outlet formed on end plate 52b).

Figure 8:
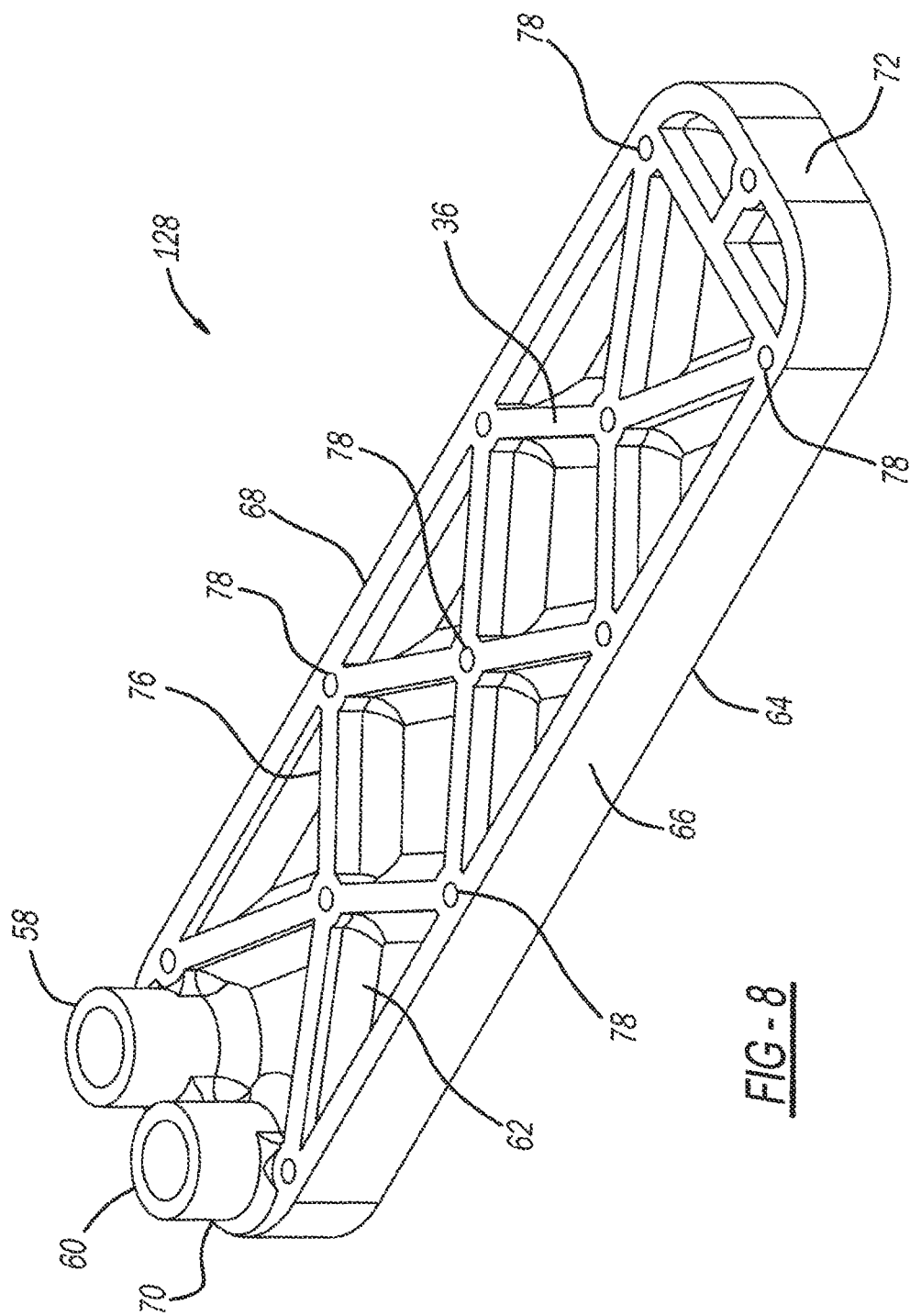
FIG. 8 is a perspective view of an end plate used in a second example thermal storage device according to a principle of the present disclosure.
Figure 9:
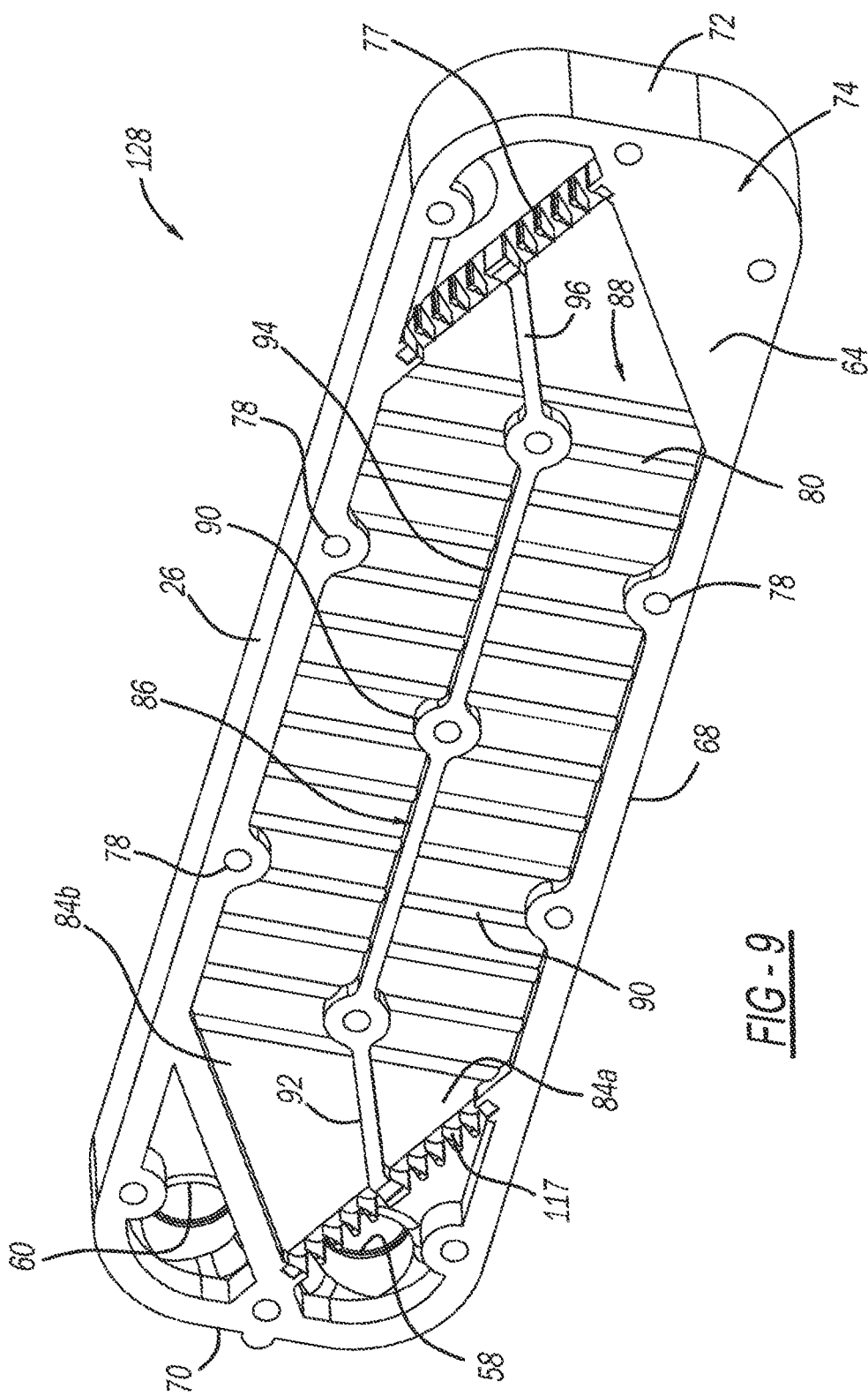
FIG. 9 is a perspective view of a flow-surface side of the end plate illustrated in FIG. 8.
Figure 10:
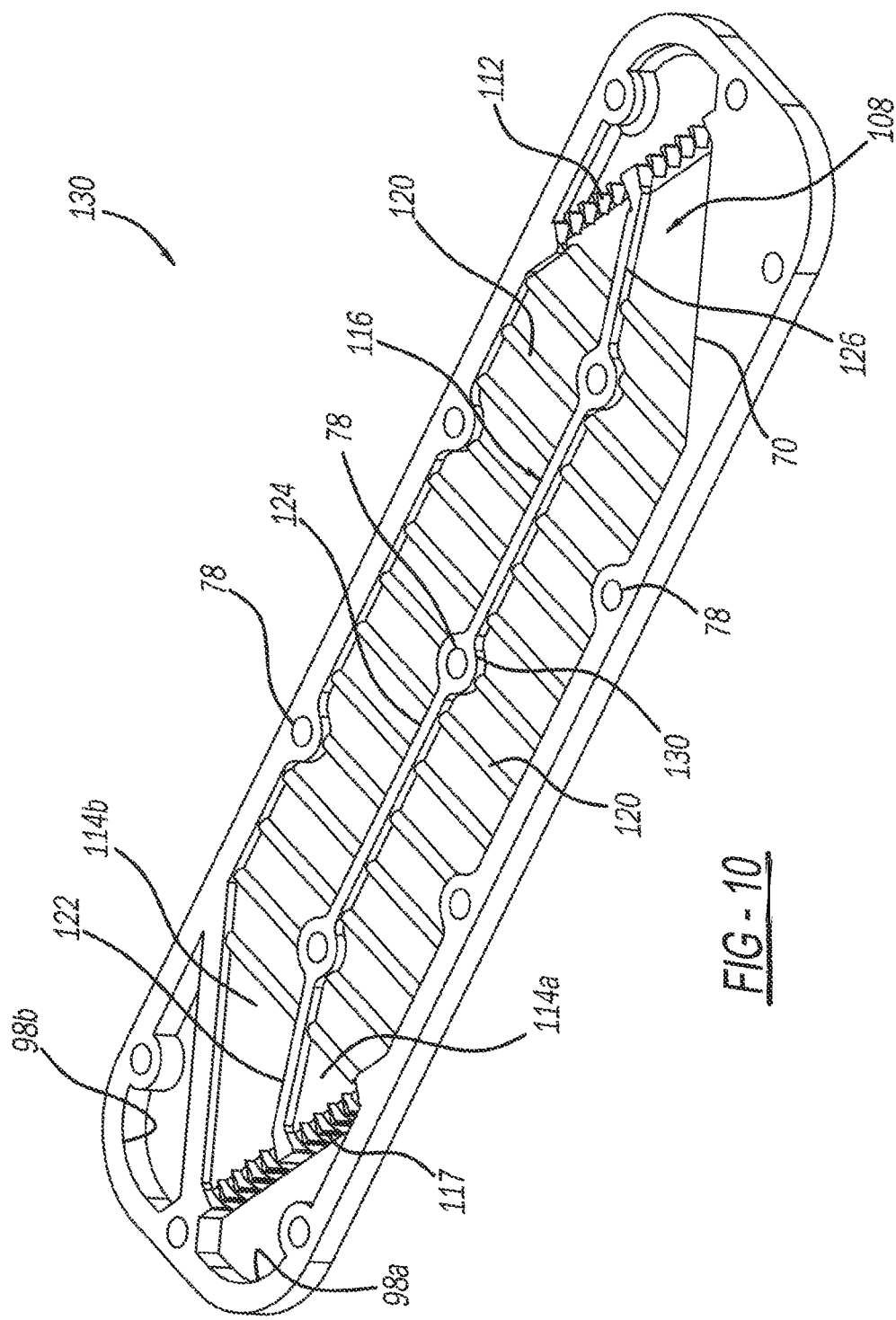
FIG. 10 is a perspective view of a flow plate used in conjunction with the end plate illustrated in FIGS. 8 and 9 to form the second example thermal storage device.

Now referring to FIGS. 8-10, end plates 128 and flow plates 130 that may be used in a second example thermal battery will be described. While only a single end plate 128 is illustrated in FIGS. 8 and 9, and only a single flow plate 130 is illustrated in FIG. 10, it should be understood that a thermal battery (not illustrated) including these components will include a pair of end plates 128 that sandwich a plurality of the flow plates 130. In addition, similar to thermal battery 12, it should be understood that thermal energy transfer films 56 will be located between the end plates 128 and an adjacent flow plate 130, and between adjacent flow plates 130.

The primary difference between a thermal battery including end plates 128 and flow plates 130 is that the dimensions of a thermal battery including these components will be less than the dimensions of the thermal battery 12 illustrated in FIGS. 2-7, which enables use in a system that uses less fluid volume in comparison to a larger fluid volume system. Thus, features that are common to end plates 128 and end plates 52a and 52b, and features that are common to flow plates 130 and flow plates 14, use the same reference numbers and description thereof will be omitted. Regardless, it should be understood that a thermal battery that uses end plates 128 and flow plates 130 functions in the same manner as the thermal battery described above.

Figure 11:
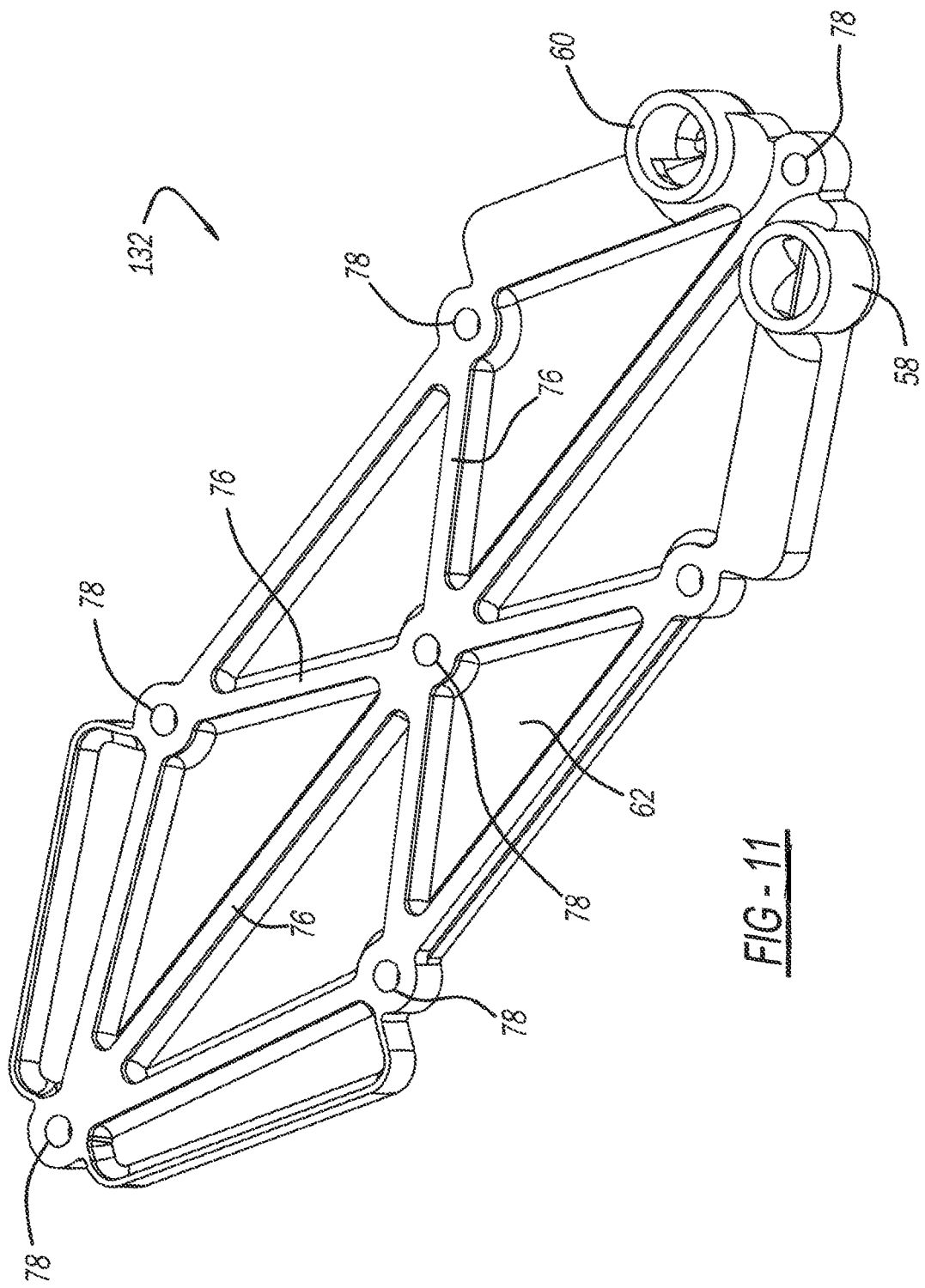
FIG. 11 is a perspective view of an end plate used in a third example thermal storage device according to a principle of the present disclosure.
Figure 12:
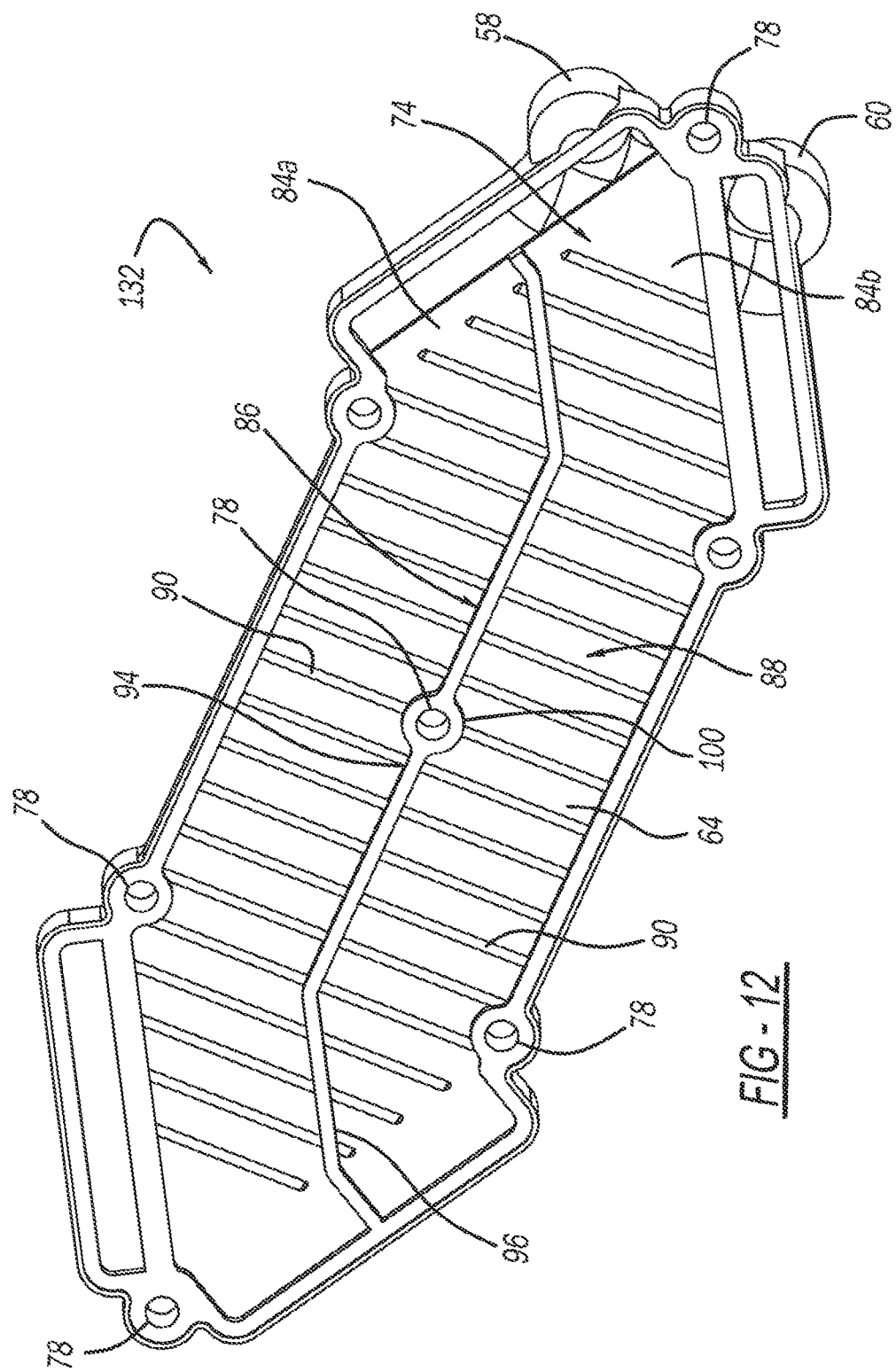
FIG. 12 is a perspective view of a flow-surface side of the end plate illustrated in FIG. 11.
Figure 13:
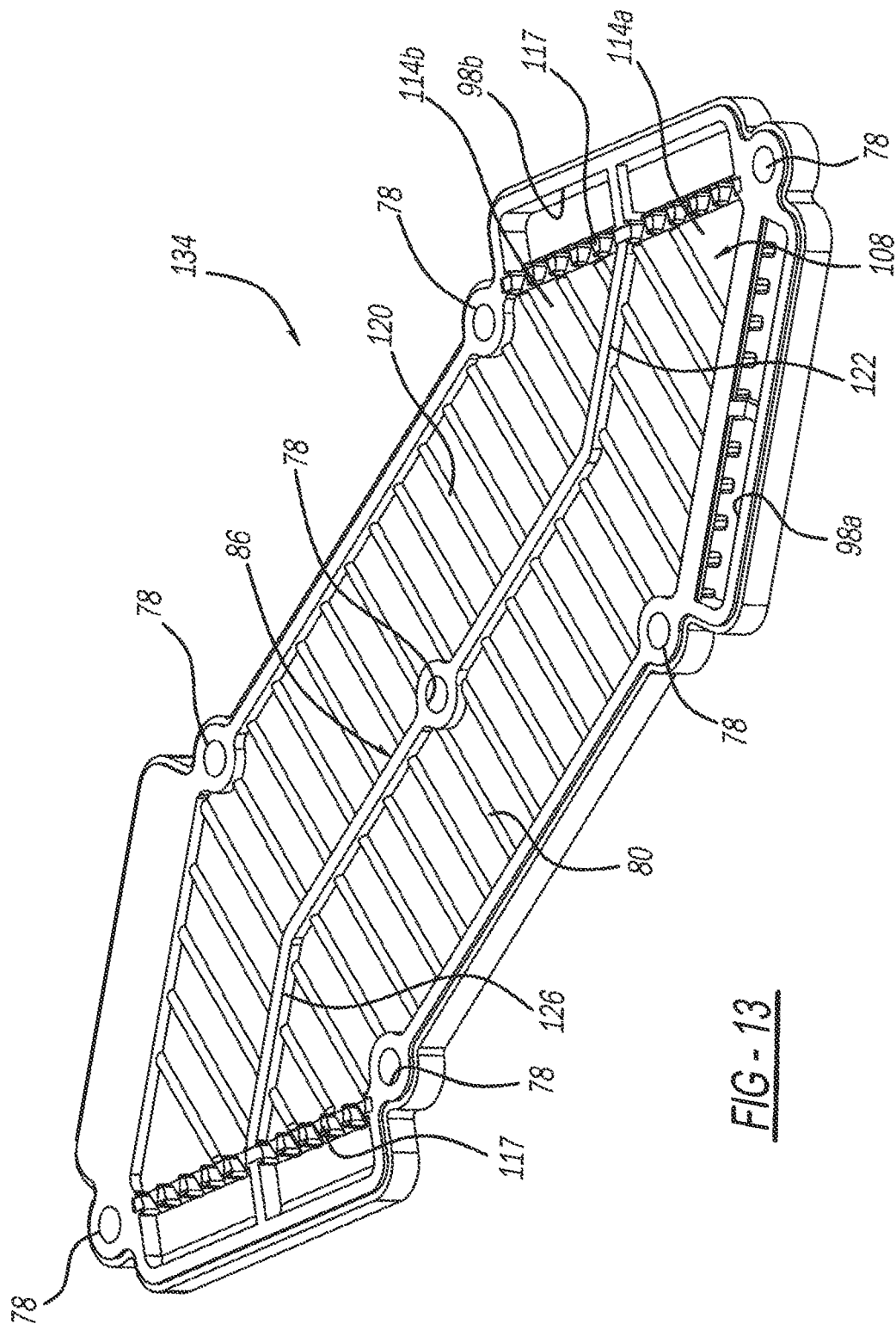
FIG. 13 is a perspective view of a flow plate used in conjunction with the end plate illustrated in FIGS. 11 and 12 to form the third example thermal storage device.

Now referring to FIGS. 11-13, end plates 132 and flow plates 134 that may be used in a third example thermal battery will be described. While only a single end plate 132 is illustrated in FIGS. 11 and 12, and only a single flow plate 134 is illustrated in FIG. 13, it should be understood that a thermal battery (not illustrated) including these components will include a pair of end plates 132 and that sandwich a plurality of the flow plates 134. In addition, similar to thermal battery 12, it should be understood that thermal energy transfer films 56 will be located between the end plates 132 and an adjacent flow plate 134, and between adjacent flow plates 134.

The primary difference between a thermal battery including end plates 132 and flow plates 134 is that a shape of a thermal battery including these components is different from the shape of the components used in the thermal battery 12 and the thermal battery (not illustrated) that uses end plates 132 and flow plates 134. In this regard, the shape of end plates 132 and flow plates 134 is hexagonal rather than rectangular, which enables use in a system that has different packaging requirements. While the shape of a thermal battery using end plates 132 and flow plates 134 may be different to account for packaging restraints, it should be understood that an overall size of such a thermal battery may have a greater or lesser fluid volume in comparison to the previously described thermal batteries. Thus, features that are common to end plates 132 and end plates 52a and 52b, and features that are common to flow plates 134 and flow plates 44, use the same reference numbers and description thereof will be omitted. Regardless, it should be understood that a thermal battery that uses end plates 132 and flow plates 134 functions in the same manner as the thermal battery 12 described above.

Figure 14:
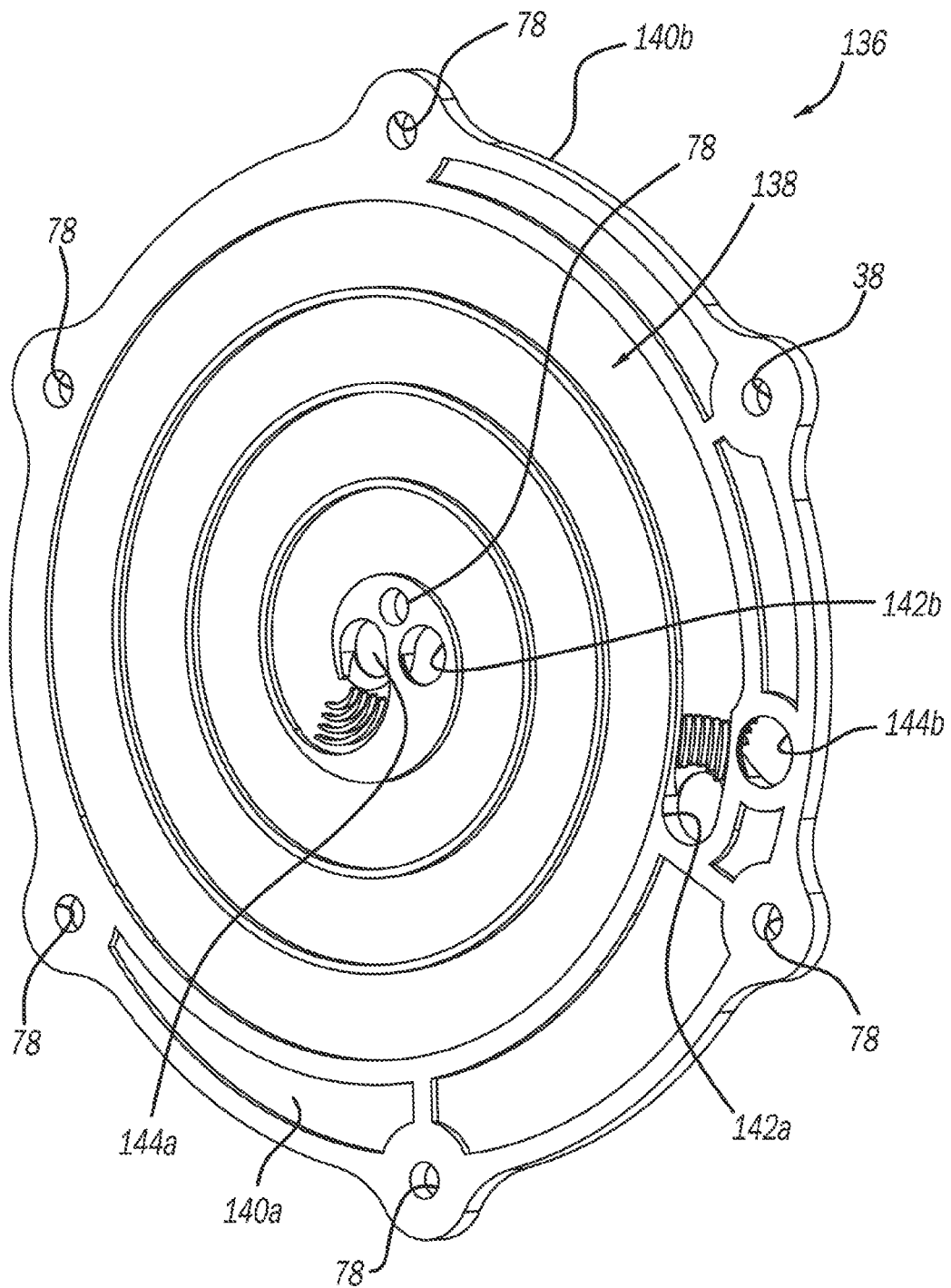
FIG. 14 is a perspective view of a flow plate that that may be used in a fourth example thermal storage device according to a principle of the present disclosure.

Now referring to FIG. 14, another flow plate 136 for use in a fourth example thermal battery (not illustrated) will be described. While only a single flow plate 136 is illustrated in FIG. 14, it should be understood that a thermal battery (not illustrated) including this component will include a pair of end plates (not shown) that sandwich a plurality of the flow plates 136. In addition, similar to thermal battery 12, it should be understood that thermal energy transfer films 56 will be located between adjacent flow plates 136, and between an end plate (not illustrated) and an adjacent flow plate 136.

The primary difference between a thermal battery including flow plates 136 is that a flow channel 138 that is formed on each opposing major surface 140a and 140b of the flow plate 136 are scroll-shaped, which enables the flow channel 138 to have a sufficient length to enable thermal energy exchange from the fluid flowing through the flow channel 138 while minimizing the overall size of a thermal battery (not illustrated) that includes the flow plate 136. Flow plate 136 includes a first inlet port 142a that may communicate with a fluid inlet (not shown) of an end plate (not shown). The scroll-shaped flow channel 138 travels from inlet port 142a to an outlet port 144a. Flow plate 136 also includes a second inlet port 142b that receives fluid from the outlet port 144a of an adjacent flow plate 136, which then travels through the flow channel 128 to a second outlet port 144b that communicates with either a fluid outlet of an adjacent end plate (not shown) or with a fluid inlet 142a of an oppositely adjacent flow plate 136. Thus, working fluid may flow in one direction on one side 140a of the plate (e.g., from inlet port 142a to outlet port 144a), while the stationary phase change material may be located in the flow channel 138 that extends in the opposite direction (e.g., from inlet port 142b to outlet port 144b) on the other side 140b of the flow plate 136.

It should be understood that the end plates (e.g., 52a, 52b) and flow plates (e.g., 54) of each of the above-described example embodiments may have any three-dimensional shape so long as the end plates and flow plates can support a thermal energy transfer film 56 between two or more flow paths. In this regard, while thermal batteries are illustrated having rectangular plates (e.g., FIGS. 1-10), hexagonal (e.g., FIGS. 11-13), or round (e.g., FIG. 14), other three-dimensional plates are contemplated (e.g., oval, square, triangular, and other). In this regard, because the end plates and flow plates may be formed using various processes including injection or compression molding and 3D printing, the shapes, sizes, and features of the end plates and flow plates can be tailored to the specific application in which the thermal battery 12 is to be used.

Figure 15:
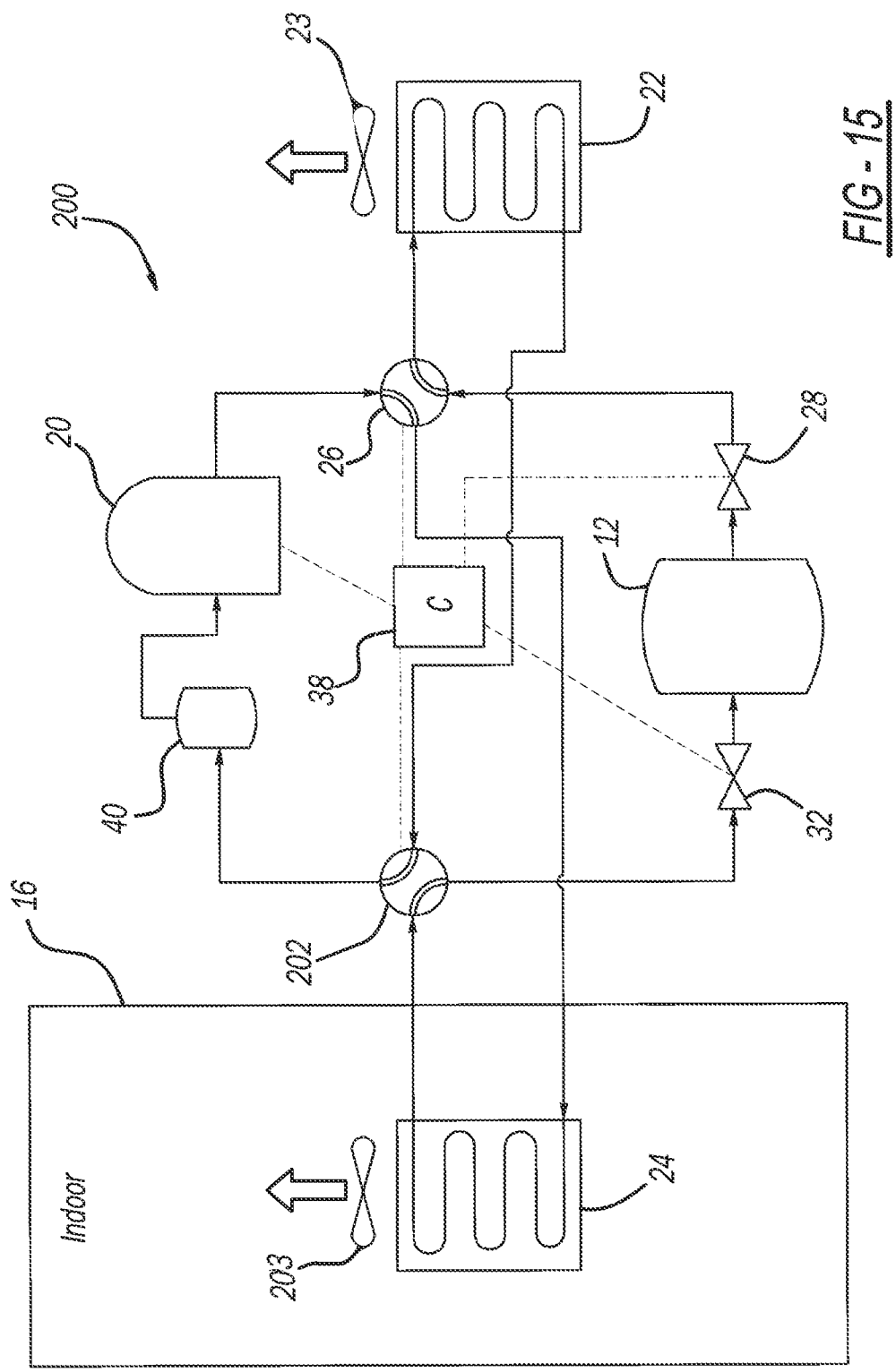
FIG. 15 is a schematic illustration of another heating and cooling system including a thermal storage device according to a principle of the present disclosure.

Now referring to FIG. 15, another HVAC system 200 is illustrated that utilizes a thermal battery 12 that may be any thermal battery that is illustrated in FIGS. 2-14. HVAC system 200 is similar to HVAC system 10 illustrated in FIG. 1 in that HVAC system 200 includes a compressor 20, a first heat exchanger 22, a second heat exchanger 24, a first expansion valve 28, a second expansion valve 32, and an optional accumulator 40. System 200 differs from system 10 in that system 200 does not include a secondary loop 14, system 200 includes a second reversing valve 202 in addition to reversing valve 26, and thermal battery 12 is located exterior to indoor structure 16 such that the "working fluid" in the illustrated embodiment is the refrigerant of the HVAC system 200. It should be understood that the material that forms thermal battery 12 (i.e., the end plates and flow plates) in the illustrated embodiment is preferably formed of a metal material such as a sintered metal material to enhance thermal energy transfer between the phase change material and the refrigerant through thermal energy transfer films 56. Thermal battery 12, however, can also be formed of polymeric materials, if desired.

Similar to system 10, HVAC system 200 may operate in a first mode (e.g., cooling) and a second mode (e.g., heating). In either mode, the flow of refrigerant is always in the same direction. For example, in the illustrated second mode, the refrigerant compressed by compressor 20 will first travel through reversing valve 26, which directs the refrigerant toward second heat exchanger 24, which operates as a condenser. After exiting second heat exchanger 24, the refrigerant will pass through second reversing valve 202, which directs the refrigerant toward second expansion valve 32. Depending on whether thermal battery 12 is being charged or discharged, second expansion valve 32 may be used to expand the refrigerant, or an orifice size of second expansion valve 32 may be enlarged to permit second expansion valve 32 to operate as a flow-through valve. If thermal battery 12 is being charged, second expansion valve 32 may permit further expansion of the refrigerant before entering thermal battery 12. If thermal battery 12 is being discharged, second expansion valve 32 may operate as a flow-through valve and first expansion valve 28 may permit the refrigerant to expand. If thermal battery 12 is neither being charged nor discharged and system 200 is in either the first mode or the second mode, the second expansion valve 32 will act as a flow-through valve and the first expansion valve 28 will control expansion of the refrigerant.

Assuming thermal battery 12 is being charged, second expansion valve 32 permits the refrigerant to expand before entering thermal battery 12. After conducting thermal energy exchange with the phase change material of thermal battery 12, the refrigerant exits thermal battery 12, and passes through first expansion valve 28 that permits the refrigerant to flow through without further expansion before passing through reversing valve 26 and into first heat exchanger 22, which acts as an evaporator. After exiting first heat exchanger 22, the refrigerant will travel to second reversing valve 202 that permits the refrigerant to travel to accumulator 40 and subsequently the compressor 20, where the process may then repeat.

In the second mode, each of the reversing valves 26 and 202 are reversed such that the refrigerant compressed by compressor 20 will first travel to first heat exchanger 22, which acts as a condenser. After exiting the first heat exchanger 22, the refrigerant will be directed by the second reversing valve 202 to second expansion valve 32 where, if battery 12 is being charged, the refrigerant will be permitted to pass through first expansion valve 28 without expansion, exchange thermal energy with phase change material located in battery 12, and then flow through first expansion valve 28 where the refrigerant will expand and flow toward reversing valve 26, which directs the refrigerant to second heat exchanger 24, accumulator 40, and compressor 20 where the process will repeat.

Figure 16:
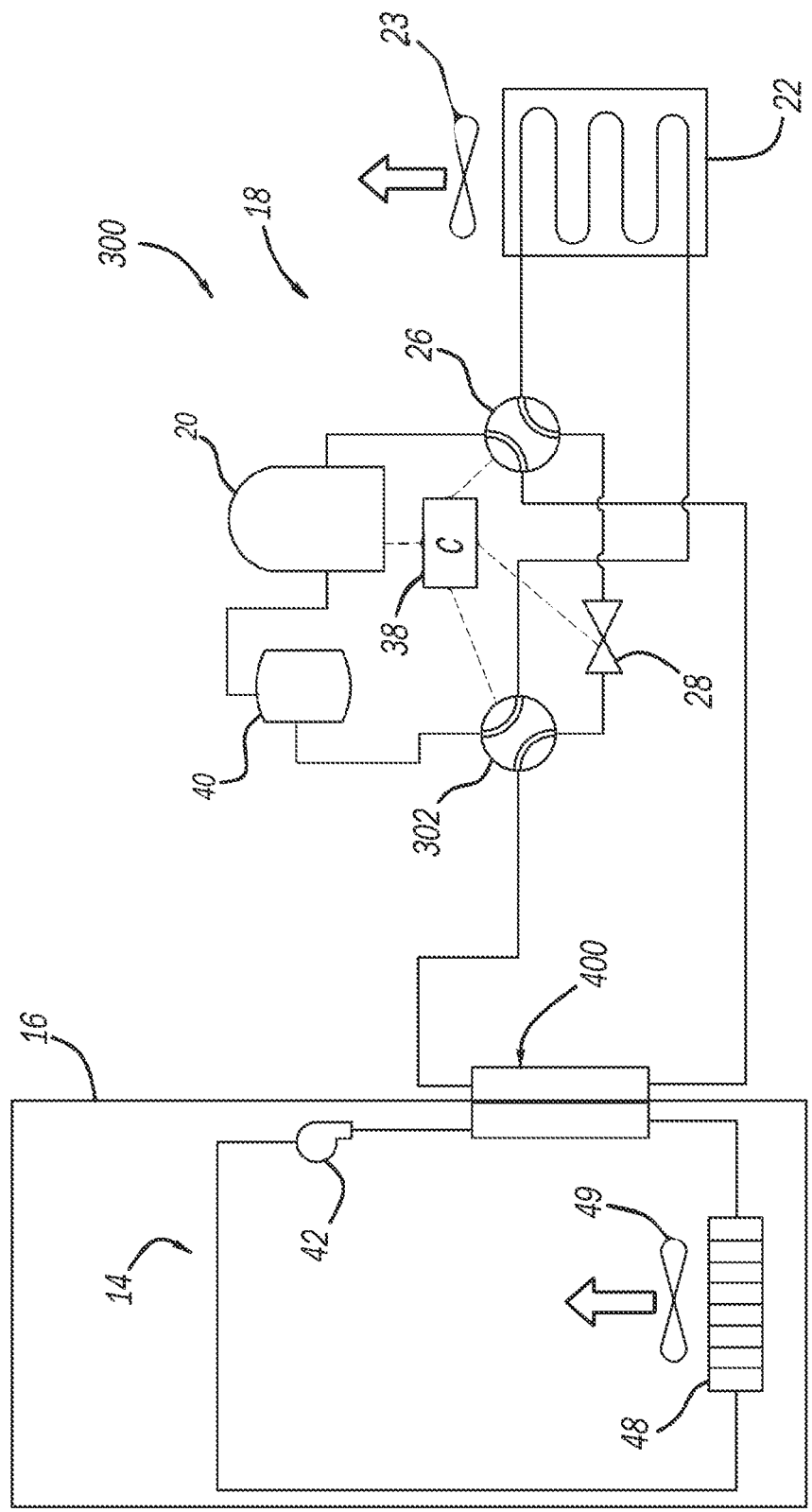
FIG. 16 is a schematic illustration of another heating and cooling system including a thermal storage device according to a principle of the present disclosure.

Now referring to FIG. 16, another HVAC system 300 including a thermal battery 400 is illustrated. System 300 includes a primary loop 18 and a secondary loop 14, with thermal battery 400 being in fluid communication with the refrigerant of the primary loop 18 and the working fluid of the secondary loop 14. The thermal battery 400 is illustrated in more detail in FIGS. 17-19.

The primary loop 18 of system 300 includes a compressor 20, a heat exchanger 22, a reversing valve 26, an expansion valve 28, a second reversing valve 302, the thermal battery 400 that acts as a second heat exchanger, and an optional accumulator 40. In the illustrated embodiment, in a first mode, the refrigerant compressed by compressor 20 first passes through reversing valve 26, which directs the refrigerant to thermal battery 400 to charge the thermal battery 400. After exiting thermal battery 400, the refrigerant travels through second reversing valve 302, which directs the refrigerant to expansion valve 28 that permits the refrigerant to expand before again passing through reversing valve 26 that directs the expanded refrigerant to heat exchanger 22. After exiting heat exchanger 22, the refrigerant again passes through second reversing valve 302, which directs the refrigerant to accumulator 40 and then compressor 20 where the process may repeat.

In a second mode, the refrigerant compressed by compressor 20 first reaches reversing valve 26, which directs the refrigerant to heat exchanger 22. After exiting heat exchanger 22, the refrigerant will travel to second reversing valve 302, which will direct the refrigerant to expansion valve 28, which will permit the refrigerant to expand. After expansion, the refrigerant will again pass through reversing valve 26, which will direct the refrigerant to thermal battery 400. After thermal energy exchange with thermal battery 400, the refrigerant will again travel through second reversing valve 302, which will direct the refrigerant to accumulator 40 and compressor 20, where the process may repeat.

Secondary loop 14 includes thermal battery 400, a heat exchanger 48, and a pump 42. The working fluid in the illustrated embodiment may be water, glycol, or a mixture thereof. As the working fluid passes through thermal battery 400, the thermal energy stored in thermal battery 400 may be discharged for use in cooling or heating indoor structure 16 by operating fan 49. If each of the primary loop 18 and secondary loop 14 are operating simultaneously, thermal battery 400 may be simultaneously charged and discharged.

Figure 17:
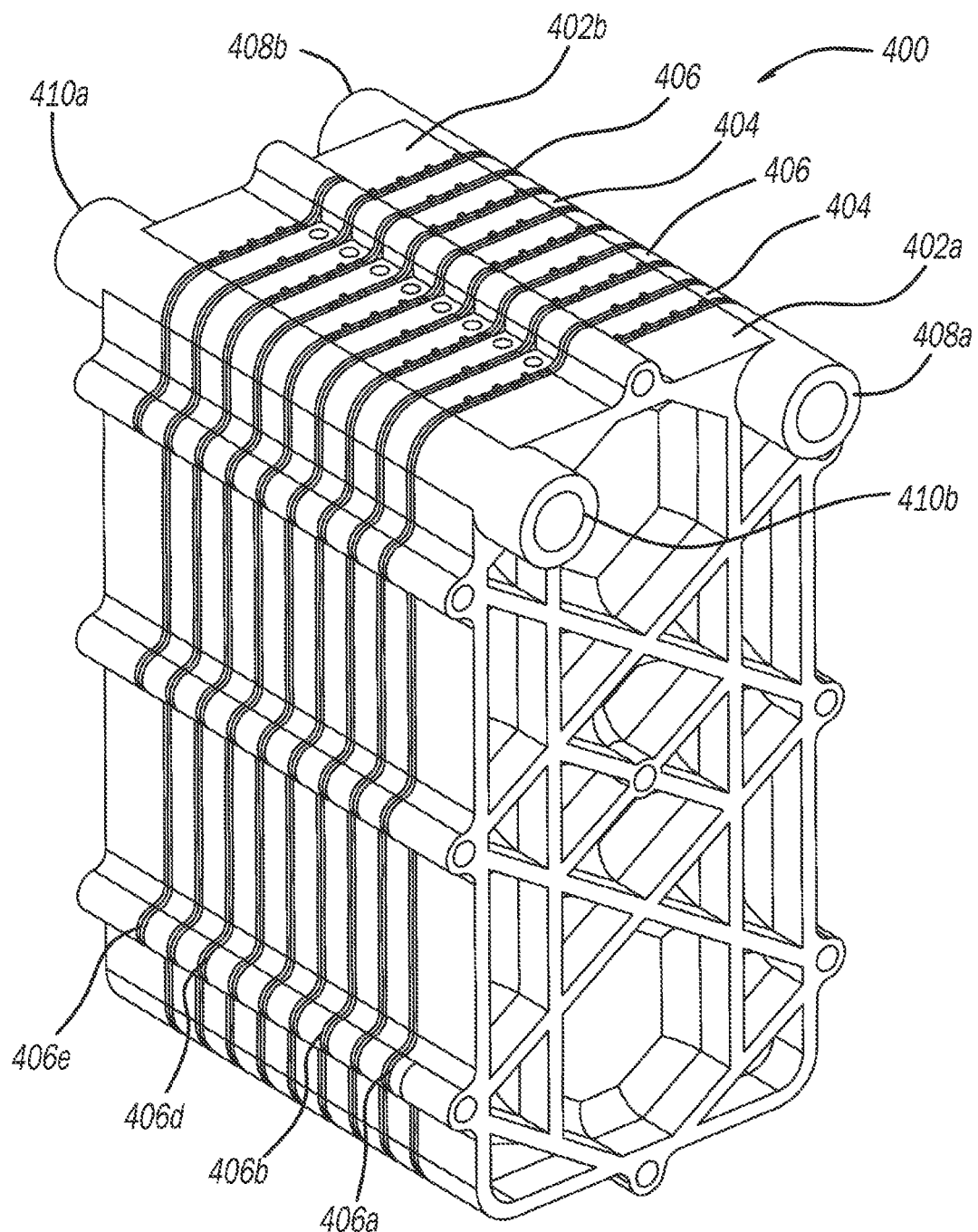
FIG. 17 is a perspective view of the thermal storage device used in the heating and cooling system illustrated in FIG. 16.
Figure 18:
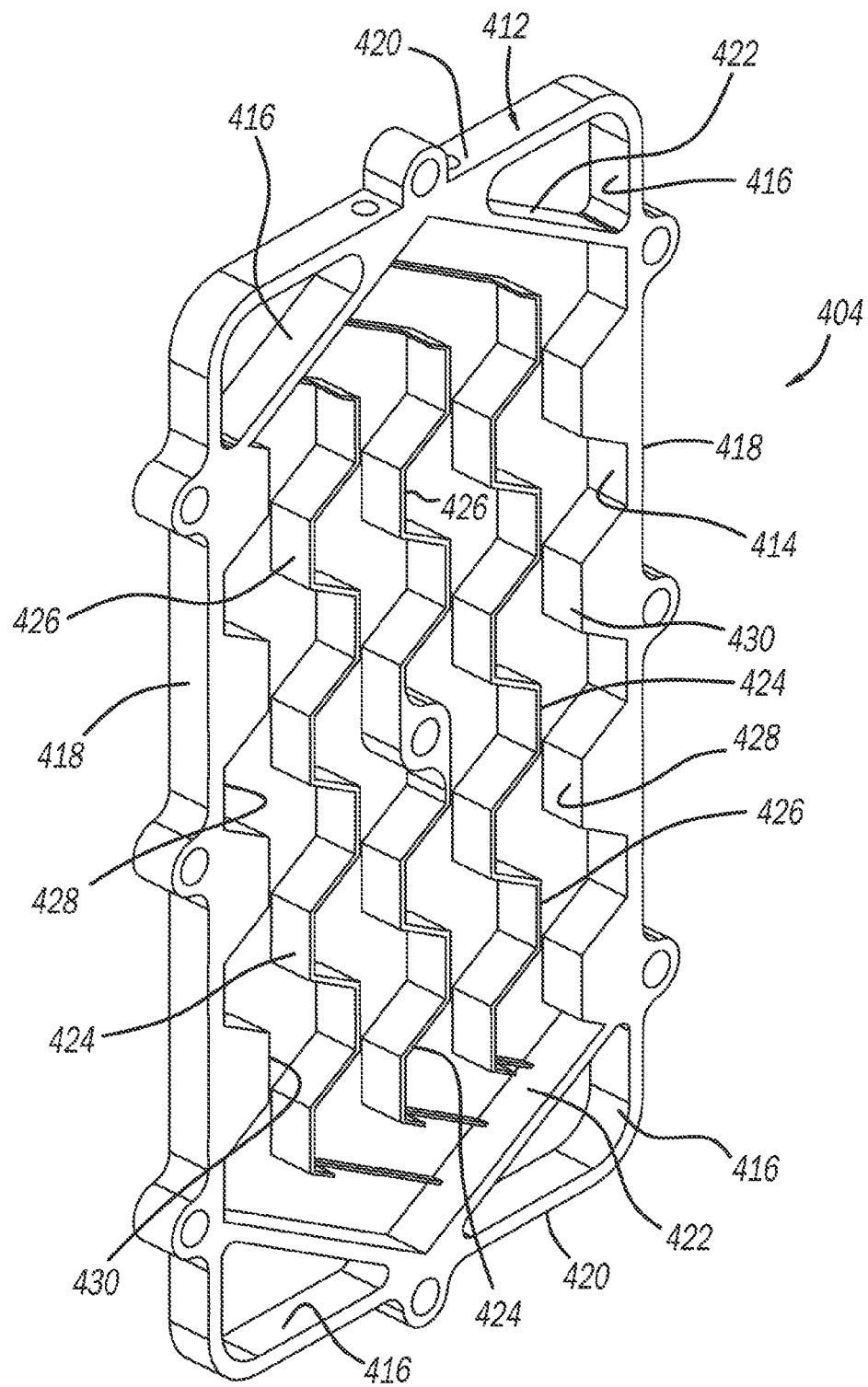
FIG. 18 is a perspective view of a phase change material storage plate of the thermal storage device illustrated in FIG. 17.
Figure 19:
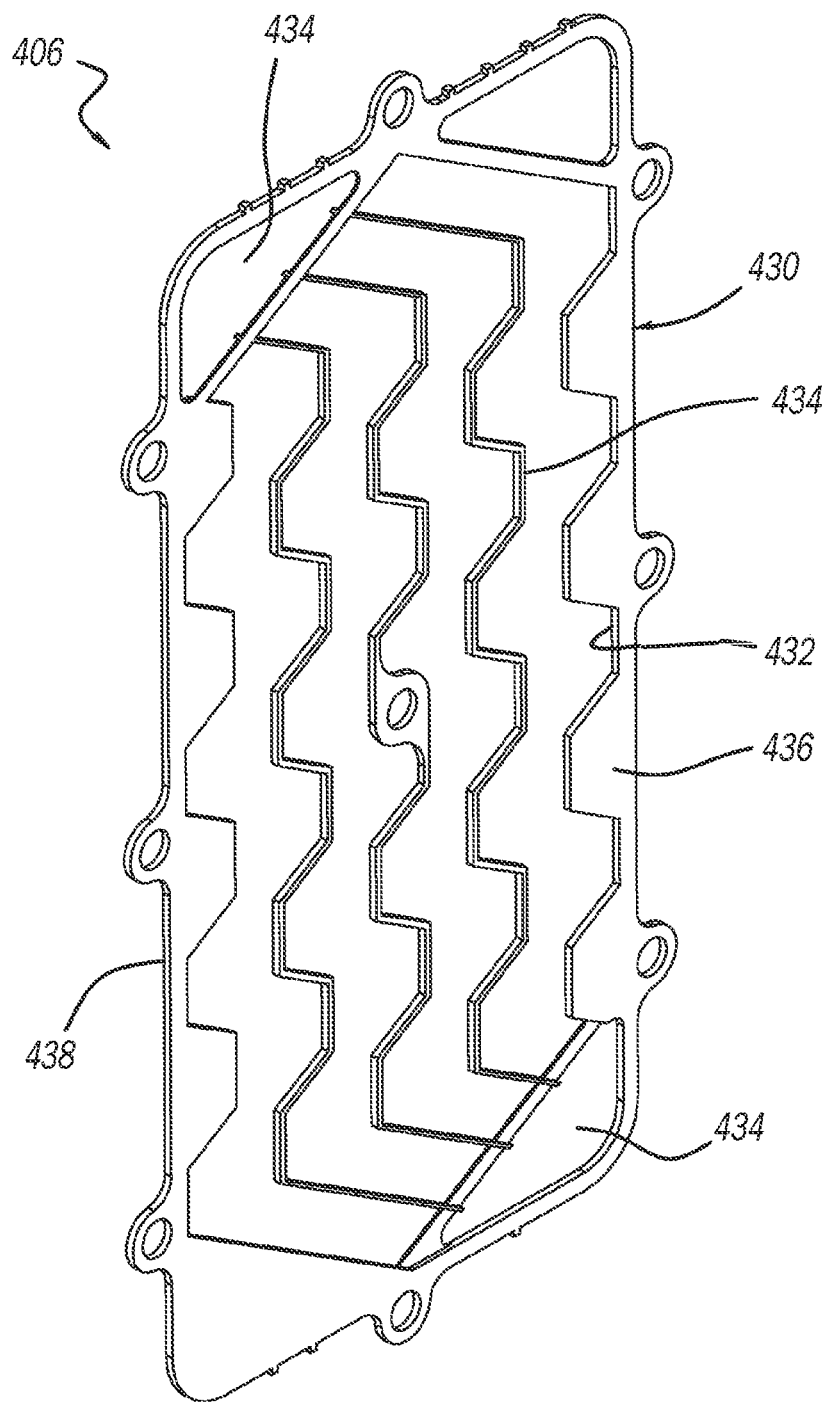
FIG. 19 is a perspective view of a flow plate of the thermal storage device illustrated in FIG. 17.

Thermal battery 400 is illustrated in FIGS. 17-19. As noted above, thermal battery 400 is configured to allow the refrigerant of primary loop 18 to pass therethrough, and also configured to allow the working fluid of secondary loop 14 to pass therethrough. Thermal battery 400 includes a first end plate 402a and a second end plate 402b that sandwich a plurality of phase change material storage plates 404. A flow plate 406 is positioned between adjacent storage plates 404, and also positioned between a respective end plate 402a, 402b and an adjacent storage plate 404. Although not visible in FIG. 17, it should also be understood that thermal energy transfer films 56 are positioned on opposing sides of each of the flow plates 406 to prevent intermixing of the refrigerant and working fluid with the phase change material(s) stored in storage plates 404, and to enable thermal energy transfer between the refrigerant and working fluid with the phase change material(s) stored by storage plates 404. The end plates 402a, 402b, the storage plates 404, and the flow plates 406 may each be formed of a polymeric material that is impermeable and resistant to corrosion.

End plate 402a includes a refrigerant inlet 408a and a working fluid outlet 410b. End plate 402b includes a refrigerant outlet 408b and a working fluid inlet 410a. Inasmuch as end plates 402a and 402b are substantially similar to end plates 52a and 52b, further description thereof will be omitted.

Turning to FIG. 18, each storage plate 404 is a planar member having a perimeter 412 that defines a central aperture 414. Perimeter 412 also defines a plurality of flow openings 416 that permit the refrigerant and working fluid to flow therethrough before traveling between the thermal energy transfer film 56 and flow plate 406, as will be described in more detail later. Perimeter 412 includes a first pair of opposing elongated edges 418 that extend in parallel and a second pair of opposing elongated edges 420 that extend in parallel and connect the opposing elongated edges 418. Angled members 422 also extend between a respective first elongated edge 418 and a respective second elongated edge 420 to form flow openings 416.

In addition, a plurality of elongated dividing members 424 are arranged in central aperture 414. In the illustrated embodiment, dividing members 422 extend in a direction from one of the second elongated edges 420 toward the other second elongated edge 420. More specifically, the dividing members 424 extend in a direction from one of the second elongated edges 420 toward the other second elongated edge 420 between a pair of the angled members 422 that form flow openings 416. Each dividing member 424 is a corrugated member having a plurality of first corrugations 426. An inner profile 428 of first elongated edges 418 may also include second corrugations 430 that correspond to first corrugations 426. Each storage plate 404 includes a phase change material located in central aperture 414. Alternatively, one storage plate 406 can storage one phase change material and an adjacent plate can store a second and different phase change material such that the different phase change materials alternate throughout thermal battery 400.

Now turning to FIG. 19, flow plates 406 will be described. Flow plates 406 are shaped to correspond to storage plates 404. In this regard, flow plates 406 are planar member having a periphery 430 that defines a central opening 432. Periphery 430 also defines a plurality of flow apertures 434 that permit the refrigerant and working fluid to flow therethrough before traveling between the thermal energy transfer film 56 and flow plate 406. In addition, flow plates 406 each include a plurality of elongated dividing bars 434 are arranged in central opening 432 that are shaped like and correspond to dividing members 424 of storage plate 404. Dividing bars 434 each have a thickness in a direction from a first major surface 436 to a second major surface 438 of flow plate 406 that is less than a thickness of periphery 430. Because dividing bars 434 have a thickness that is less than that of periphery 430, the refrigerant and working fluid are permitted to flow between dividing bars 434, and between the thermal energy transfer films 56 located on opposing sides of flow plate 406.

Now flow of the refrigerant and working fluid through the thermal battery 400 will be described. As best shown in FIG. 17, the refrigerant may enter thermal battery 400 through fluid inlet 408a of end plate 402a. The refrigerant passes through flow opening 434 of flow plate 406a and enters the flow paths between dividing bars 434 and travels through the flow paths between the dividing bars 434 toward the flow opening 434 located at the bottom of the flow plate 406a. While in the flow paths between the dividing bars 434, the refrigerant will exchange thermal energy with thermal energy transfer film 56 and the phase change material located on the opposite side of thermal energy transfer film 56 located in storage plate 404.

Similarly, the working fluid will enter thermal battery 400 through fluid inlet 410a on end plate 402b. The working fluid passes through flow opening 434 of flow plate 406c and enters the flow paths between dividing bars 434 and travels through the flow paths between the dividing bars 434 toward the flow opening 434 located at the bottom of the flow plate 406c. While in the flow paths between the dividing bars 434, the working will exchange thermal energy with thermal energy transfer film 56 and the phase change material located on the opposite side of thermal energy transfer film 56 located in storage plate 404.

Because two fluids are passing through thermal battery 400 simultaneously, the fluids will skip intervening flow plates 406 so as not mix with each other. For example, the refrigerant that passes through flow plate 406a will not flow through the flow paths of the next plate 406, but will instead pass through an opening 104 of the thermal energy transfer film 56 and on to the next flow plate 406b. This will continue until the refrigerant exits thermal battery 400 through outlet 408b.

Similarly, the working fluid that enters thermal battery 400 through fluid inlet 410a on end plate 402b will skip the next flow plate 406. That is, the working fluid that passes through flow plate 406c will not flow through the flow paths of the next plate 406, but will instead pass through an opening 104 of the thermal energy transfer film 56 and on to the next flow plate 406d. This will continue until the working fluid exits thermal battery 400 through outlet 410b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A heating and cooling system, comprising:
   a compressor;
   a first heat exchanger;
   a second heat exchanger;
   a first expansion valve positioned between the first heat exchanger and the second heat exchanger;
   a second expansion valve positioned between the first heat exchanger and the second heat exchanger;
   a first valve and a second valve positioned on opposing sides of the first expansion valve that cooperate to permit flow through the first expansion valve or direct flow to bypass the first expansion valve;
   a third valve and a fourth valve positioned on opposing sides of the second expansion valve that cooperate to permit flow through the second expansion valve or direct flow to bypass the second expansion valve;
   a first reversing valve that permits the system to operate in a first mode and a second mode; and
   a thermal battery including a phase change material therein that is configured to selectively store and release thermal energy received from a working fluid, wherein the thermal battery includes a pair of end plates, each of the pair of end plates including a first major surface and an opposite second major surface, the first major surfaces each including fluid inlet and a fluid outlet and the opposite second major surfaces each including a flow trough, the fluid inlet of each of the pair of end plates being in communication with the flow trough formed on the opposite second major surface of the respective end plate of the pair of end plates;

a plurality of flow plates sandwiched between the pair of end plates, each of the plurality of flow plates having a first side and an opposite second side, and each of the first side and the opposite second side including a flow surface, the flow surfaces of each of the plurality of flow plates being configured to communicate with either the flow trough of an adjacent end plate of the pair of end plates or one of the flow surfaces of an adjacent flow plate of the plurality of flow plates;

a plurality of thermal energy transfer films that are respectively positioned between adjacent flow plates of the plurality of flow plates, and between each of the end plates and an immediately adjacent flow plate of the plurality of flow plates, such that a first flow path exists on one side of a respective thermal energy transfer film for the working fluid and a second flow path exists on an opposite side of the respective thermal energy transfer film for the phase change material; and the flow troughs and flow surfaces communicate with each other such that the working fluid that flows through the first flow path enters the fluid inlet of one of the end plates of the pair of end plates and exits the fluid outlet of the other end plate while exchanging thermal energy with the phase change material that is provided in the second flow path that extends between the fluid inlet of the other end plate and the fluid outlet of the one of the end plates of the pair of end plates, wherein the compressor, the first heat exchanger, the first reversing valve, and the first expansion valve are located in a primary circuit and the thermal battery is located in a secondary circuit that includes a third heat exchanger and a pump, wherein the second heat exchanger is shared by each of the primary circuit and the secondary circuit, wherein in the first mode a refrigerant compressed by the compressor is directed by the first reversing valve to the first exchanger, after passing through the first heat exchanger the first valve and the second valve cooperate to direct the refrigerant to bypass the first expansion valve and the third valve and the fourth valve cooperate to direct the refrigerant through the second expansion valve and on to the second heat exchanger;

wherein in the second mode the refrigerant compressed by the compressor is directed by the first reversing valve to the second heat exchanger, after passing through the second heat exchanger the third valve and the fourth valve cooperate to direct the refrigerant to bypass the second expansion valve and the first valve and the second valve cooperate to direct the refrigerant through the first expansion valve and on to the first heat exchanger; and wherein the secondary circuit further includes a second thermal battery, and a pair of three-way valves that are configured to either direct the working fluid to the thermal battery or the second thermal battery or prevent the working fluid from reaching the thermal battery and the second thermal battery.

2. The system according to claim 1, wherein the working fluid is located in the secondary circuit and exchanges thermal energy with the refrigerant of the primary circuit in the second heat exchanger.

3. The system according to claim 1, wherein an orifice size of the first and second expansion valves can be modified to either expand the refrigerant or permit the refrigerant to flow therethrough without expansion.

* * * * *